United States Patent
Chang et al.

(10) Patent No.: US 7,826,493 B2
(45) Date of Patent: Nov. 2, 2010

(54) FREQUENCY OFFSET CORRECTION CIRCUIT FOR WCDMA

(75) Inventors: Li Fung Chang, Holmdel, NJ (US);
Nelson Sollenberger, Farmingdale, NJ (US); Baoguo Yang, Iselin, NJ (US)

(73) Assignee: Broadcom Corp.

( * ) Notice: Subject to any disclaimer, the term of this patent is extended or adjusted under 35 U.S.C. 154(b) by 2719 days.

(21) Appl. No.: 10/228,165

(22) Filed: Aug. 26, 2002

(65) Prior Publication Data
US 2003/0043768 A1 Mar. 6, 2003

Related U.S. Application Data

(60) Provisional application No. 60/315,377, filed on Aug. 27, 2001.

(51) Int. Cl.
*H04J 3/06* (2006.01)
(52) U.S. Cl. ............... 370/514; 370/503; 370/509; 375/152
(58) Field of Classification Search ............ 370/281, 370/290, 295, 320, 324, 330, 335, 342, 210, 370/310, 312, 328, 329, 350, 432, 436, 478, 370/509–514; 455/75, 524, 525; 375/137, 375/140, 143, 149, 152, 327, 344, 362, 365, 375/368, 373, 376
See application file for complete search history.

(56) References Cited
U.S. PATENT DOCUMENTS
6,084,932 A * 7/2000 Veintimilla ............ 375/355

6,134,286 A * 10/2000 Chennakeshu et al. ...... 375/365
6,266,361 B1 * 7/2001 Huang et al. ............ 375/140

(Continued)

FOREIGN PATENT DOCUMENTS
WO  WO 00/57569   9/2000

(Continued)

OTHER PUBLICATIONS

Li, Chi-Fang et al., "An Integrated Pseudo-Noise Code Acquisition Processor for WCDMA, CDMA2000 and 802.11b Systems," IEEE International Symposium on Circuits and Systems, ISCAS 2005. May 2005. vol. 5. pp. 5043-5046.*

(Continued)

*Primary Examiner*—Donald Mills
(74) *Attorney, Agent, or Firm*—McAndrews, Held & Malloy, Ltd.

(57) ABSTRACT

Methods and apparatus for acquiring and verifying a code used by a base station. Acquisition time is reduced and circuitry simplified by performing Phase I and Phase II acquisitions in series, but in parallel with Phase III acquisition and verification, which are done in series. Phase III code acquisition is done by despreading the input signal using each of the possible codes in a code group. An estimation of the frequency offset between the base station and the terminal's local reference is used to correct the phase of the despread signals, which are coherently and non-coherently integrated. The largest accumulated value corresponds to the code used by the base station. The code is verified by despreading the received signal, applying a frequency correction, and demodulating. The demodulated output is a series of symbols, and a count of these symbols verifies the acquired code.

24 Claims, 19 Drawing Sheets

U.S. PATENT DOCUMENTS

| | | | |
|---|---|---|---|
| 6,373,861 B1 * | 4/2002 | Lee | 370/503 |
| 6,775,318 B2 * | 8/2004 | Chen et al. | 375/149 |
| 6,831,929 B1 * | 12/2004 | Sriram et al. | 370/515 |
| 2002/0041580 A1 * | 4/2002 | Shoji et al. | 370/335 |

FOREIGN PATENT DOCUMENTS

| WO | WO 01/01596 | 1/2001 | |
|---|---|---|---|
| WO | WO 0225881 A1 * | 3/2002 | |

OTHER PUBLICATIONS

Hosur, S., et al., "Design of Cyclically Permutable Codes for PN Code Acquisition in WCDMA TDD Mode," 52nd Vehicular Technology Conference, IEEE VTS. Sep. 2000. vol. 2. pp. 581-587.*

K. Higuchi et al., "Fast Cell Search Algorithm in DS-CDMA Mobile Radio Using Long Spreading Codes", Mar. 1997, IEEE.

* cited by examiner

810 — INPUT SIGNAL $\quad S_0, S_1, S_2, S_3, S_4, \ldots S_n$

820 — DELAY 1 SAMPLE $\quad S_0, S_1, S_2, S_3, \ldots S_{n-1}$

830 — COMPLEX CONJUGATE $\quad S_0^*, S_1^*, S_2^*, S_3^*, \ldots S_{n-1}^*$

840 — MULTIPLY $\quad S_1 \cdot S_0^*, S_2 \cdot S_1^*, S_3 \cdot S_2^*, \ldots S_n \cdot S_{n-1}^*$ 850 — INTEGRATE $\quad (S_1 \cdot S_0^* + S_2 \cdot S_1^* + \ldots S_n \cdot S_{n-1}^*)/n$ 860 — ARCTAN $\quad$ PHASE $[(S_1 \cdot S_0^* + S_2 \cdot S_1^* + \ldots S_n \cdot S_{n-1}^*)/n]$ IF: $\quad S_0 = Ae^{-j\theta_0} \quad$ Then: $\quad S_0^* = Ae^{j\theta_0}$ $\qquad S_1 = Be^{-j\theta_1} \qquad\qquad\quad S_1^* = Be^{j\theta_1}$ 870 $\qquad S_2 = Ce^{-j\theta_2} \qquad\qquad\quad S_2^* = Ce^{j\theta_2}$ 880

$\qquad \vdots \qquad\qquad\qquad\qquad\qquad \vdots$ $\qquad S_n = Ne^{-j\theta_n} \qquad\qquad\quad S_n^* = Ne^{j\theta_n}$

AND

890 $\quad S_1 \cdot S_0^* + S_2 \cdot S_1^* + \ldots S_n \cdot S_{n-1}^* = ABe^{j(\theta_0-\theta_1)} + BCe^{j(\theta_1-\theta_2)} + \ldots N(N-1)e^{j(\theta_{n-1}-\theta_n)}$ 892 $\quad$ IF $\quad (\theta_0-\theta_1) = (\theta_1-\theta_2) = \ldots (\theta_{n-1}-\theta_n) = \theta$ 894 $\quad$ THEN $\quad$ ARCTAN $[(S_1 \cdot S_0^* + S_2 \cdot S_1^* + \ldots S_n \cdot S_{n-1}^*)/n] = \theta$

FIG. 8

| SYMBOL | 0 | 1 | 2 | 3 | 4 | 5 | 6 | 7 | 8 | 9 |
|---|---|---|---|---|---|---|---|---|---|---|
| CCPCH (1710) | - - | 1 -1 | 1 -1 | 1 -1 | 1 -1 | 1 -1 | 1 -1 | 1 -1 | 1 -1 | 1 -1 |
| CPICH2 (1720) | A | -A | -A | A | A | -A | -A | A | A | -A |
| 256-CHIP CORRELATIONS (1730) | $S_0$ | $S_1$ | $S_2$ | $S_3$ | $S_4$ | $S_5$ | $S_6$ | $S_7$ | $S_8$ | $S_9$ |
| DELAYED COMPLEX CONJUGATE (1740) | | $S_0^*$ | $S_1^*$ | $S_2^*$ | $S_3^*$ | $S_4^*$ | $S_5^*$ | $S_6^*$ | $S_7^*$ | $S_8^*$ |
| PRODUCTS (1760) | | $S_1 \cdot S_0^*$ | $S_2 \cdot S_1^*$ | $S_3 \cdot S_2^*$ | $S_4 \cdot S_3^*$ | $S_5 \cdot S_4^*$ | $S_6 \cdot S_5^*$ | $S_7 \cdot S_6^*$ | $S_8 \cdot S_7^*$ | $S_9 \cdot S_8^*$ |
| INTEGRATED TERMS (1770) | | | $S_2 \cdot S_1^*$ | + | $S_4 \cdot S_3^*$ | + | $S_6 \cdot S_5^*$ | + | $S_8 \cdot S_7^*$ | |

← 256 chips →

1750: 1685, 1690

1780: ARCTAN $[S_2 \cdot S_1^* + S_4 \cdot S_3^* + S_6 \cdot S_5^* + S_8 \cdot S_7^*] = \theta$ WHERE $\theta \approx$ TWICE RESIDUAL FREQUENCY OFFSET REMAINING FROM FIRST COARSE CORRECTION

FIG. 17

FREQUENCY OFFSET CORRECTION CIRCUIT FOR WCDMA

CROSS-REFERENCES TO RELATED APPLICATIONS

This application claims the benefit of U.S. provisional application No. 60/315,377, filed Aug. 27, 2001, which is incorporate by reference.

BACKGROUND OF THE INVENTION

The present invention relates to circuits and techniques for scrambling code acquisition and verification in code-division-multiple-access wireless systems.

FIG. 1 illustrates an example of a wireless communications system which may benefit by the inclusion of embodiments of the present invention. Included are a base station 110, antenna 120, transmit signal 130, and terminal or handset 140. Signals transmitted by the base station 110 using antenna 120 are received by the terminal 140. Base station 110 may communicate with more than one terminal or handset 140 using antenna 120. Base station 110 may use more than one antenna 120. Terminal or handset 140 may receive signals from more than one base station 110 and antenna 120.

In particular, the base station 110 may use antenna 120 to transmit a code division multiple access (CDMA) or wideband CDMA (WCDMA) signal 130. In that case, each base station 110 uses a unique scrambling code to separate its transmitted signal from those of other base stations 110. The scrambling codes are organized into 64 code groups of eight codes each. Terminal or handset 140 determines the scrambling code group and code being used by the base station 110.

In wideband CDMA or 3G systems, the base station 110 uses antenna 120 to transmit a signal 130 that includes two types of information. The first includes synchronizing and code information, while the second includes data payloads.

FIG. 2 is a representation of synchronizing and code information that forms part of a transmitted signal in WCDMA. Included are a number of primary sync signals 210, secondary sync signals 220, and a common pilot channel signal 230 occurring in a frame 240. Further explanation of these signals and the signals in FIG. 11 may be found in 3rd Generation Partnership Project; Technical Specification Group Radio Access Network; Spreading and modulation (FDD) (Release 1999), 3GPP TS 25.213 V3.5.0 (2001-03), which is incorporated by reference.

Each frame 240 is 10 milliseconds in duration. There are 15 slots per frame, and each slot includes one primary sync 210 of 256 chips, one secondary sync 220, also of 256 chips, and one CPICH 230 of 2560 chips. The chip rate is 3.84 Mchips per second.

The primary sync signal is made up of identical 256 chips sequences, and is used to convey time slot boundary information. Each secondary sync signal is simultaneous with the primary sync signal and is made up of one of 16 different 256 chips sequences, which are varied in one of 64 different patterns that repeat each frame. Each of these 64 patterns correspond to one of the 64 code groups used. The CPICH signal 230 is an all ones signal that is scrambled by one of the 8 codes in the code group. This is the same code that base station 110 uses to scramble data payloads. The terminal or handset 140 receives this information, and from it determines the time slot boundary timing, code group, and code used by the base station 110.

Thus, what is need are reliable methods and circuits for determining or acquiring the code used by the base station 110, and verifying that the acquired code is the code being used by the base station 110.

SUMMARY

Accordingly, embodiments of the present invention provide methods and apparatus for acquiring the code used by the base station 110, and verifying that the acquired code is the code being used by the base station 110. Acquisition time is reduced and the circuitry simplified by performing Phase I and Phase II acquisitions in series, but in parallel with Phase III acquisition and verification, which are done in series. Phase III code acquisition is done by despreading the input signal using each of the possible codes in a code group. An estimation of the frequency offset between the base station and the terminal's local reference is made. This estimation is used to correct the phase of the despread signals, which are coherently, then non-coherently integrated. The largest accumulated value corresponds to the code used by the base station. The code is verified by despreading the common pilot channel, again applying a frequency correction, and demodulating the result. The demodulated output is a series of common pilot symbols, and a count of these symbols verifies or disproves that the acquired code is the code used by the base station.

An exemplary embodiment of the present invention provides a method of determining a code used by a base station. The method includes serially using a primary synchronizing signal to determine a plurality of time-slot boundaries, and using a secondary synchronizing signal to determine a plurality of frame boundaries and a code group used by the base station. In parallel, at least one common pilot channel signal is used to determine the code used by the base station, and to verify that the determined code is the code used by the base station.

A further exemplary embodiment of the present invention provides a method of determining a scrambling code used by a base station. The method includes receiving a signal from the base station, determining a code group used by the base station, generating a plurality of codes in the code group, and despreading a plurality of chips of the received signal with each of the plurality of codes in the code group to generate a plurality of series of symbols. The method also includes reducing a frequency error of the plurality of series of symbols, coherently integrating the plurality of series of symbols to generate a plurality of integrated values and determining the largest integrated value. This method may also include using the largest integrated value to determine the scrambling code used by the base station.

Yet a further exemplary embodiment of the present invention provides a method of despreading a signal. This method includes receiving the signal from a base station, determining a code group used by the base station, determining a code used by the base station, and verifying the code used by the base station. This code is verified by providing the code used by the base station, despreading a plurality of symbols of the received signal with the code used by the base station to generate a first series of symbols, and using the first series of symbols to generate a first frequency correction offset estimation signal. The method further includes using the first frequency offset estimation signal to frequency adjust the received signal from the base station to generate a first frequency adjusted signal, using first frequency adjusted signal to generate a second frequency adjusted signal, and despreading the second frequency adjusted signal with the code used by the base station.

Another exemplary embodiment of the present invention provides an integrated circuit. The integrated circuit includes a code generator configured to generate a first code, a first despreader configured to despread an input signal using the first code, a first frequency correction circuit configured to adjust the frequency of the input signal, and a second frequency correction circuit configured to adjust the frequency of the first frequency corrected input signal.

Still another exemplary embodiment of the present invention provides another integrated circuit. This integrated circuit includes a first circuit configured to receive a primary synchronizing signal and to determine a plurality of time-slot boundaries, a second circuit configured to receive a secondary synchronizing signal and to determine a plurality of frame boundaries and a code group, a third circuit configured to receive a common pilot channel signal and to determine a first code, and a fourth circuit configured to verify that the common pilot channel signal is encoded using the first code. The first circuit determines the plurality of time slot boundaries and the second circuit determines the plurality of frame boundaries and the code group in series, and this series is in parallel with the third circuit determining a first code and the fourth circuit verifying the first code, which are in series.

A better understanding of the nature and advantages of the present invention may be gained with reference to the following detailed description and the accompanying drawings.

BRIEF DESCRIPTION OF THE DRAWINGS

FIG. 8 represents a method of obtaining a frequency estimate that may be used to compensate for frequency differences between a signal transmitted by a base station and a local reference clock available to a handset;

FIG. 17 illustrates the method of obtaining a fine frequency offset estimation used by the circuit of FIG. 16;

DESCRIPTION OF EXEMPLARY EMBODIMENTS

Figure 1:
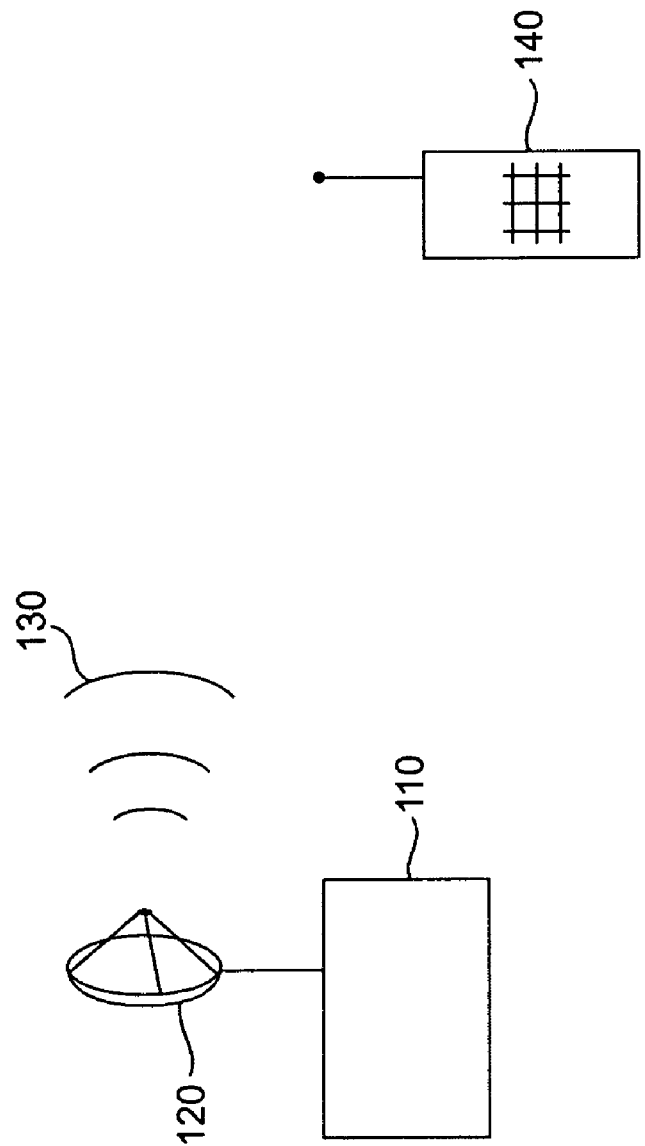
FIG. 1 illustrates an example of a wireless communications system which may benefit by the inclusion of embodiments of the present invention.
Figure 2:
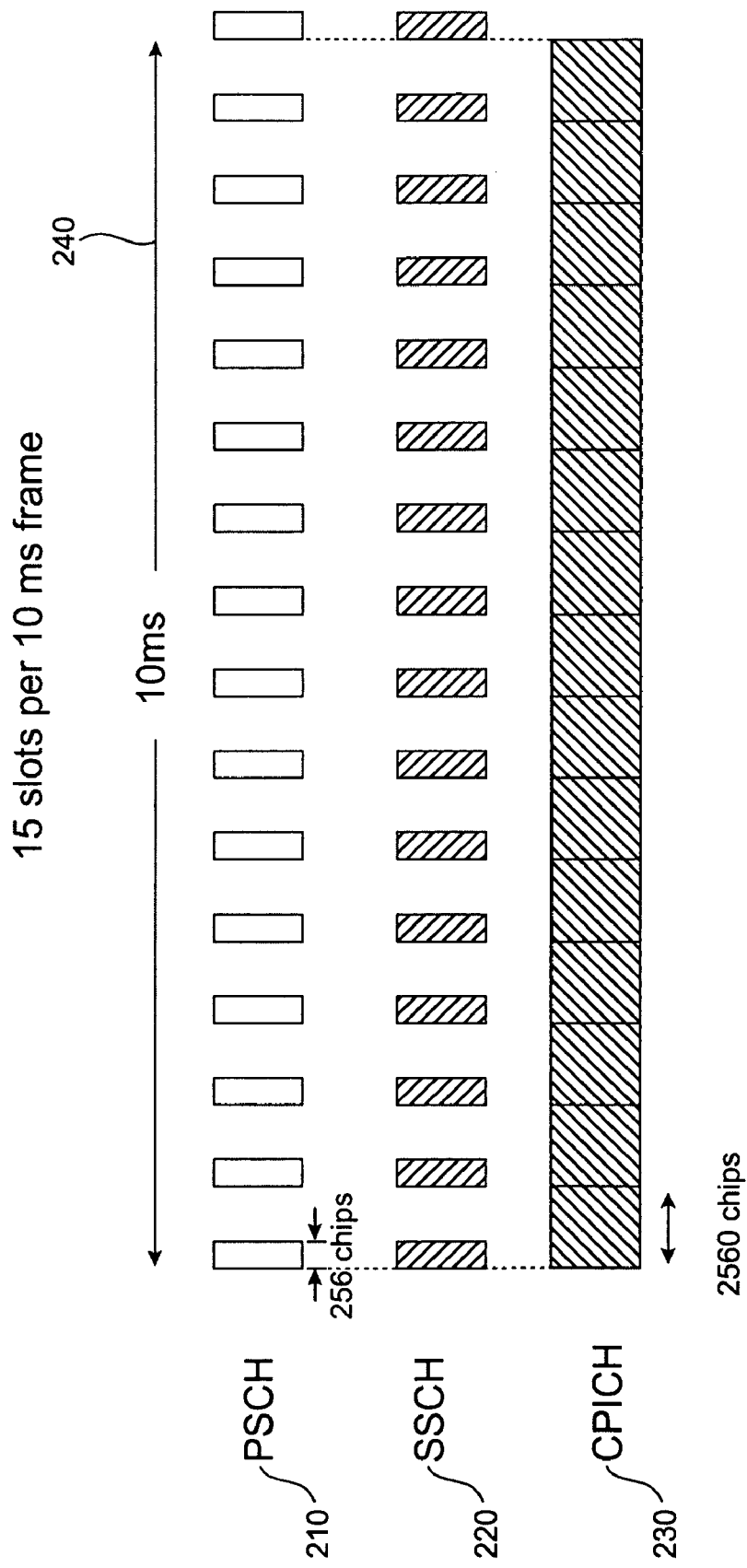
FIG. 2 is a representation of synchronizing and code information that forms part of a transmitted signal in WCDMA.
Figure 3:
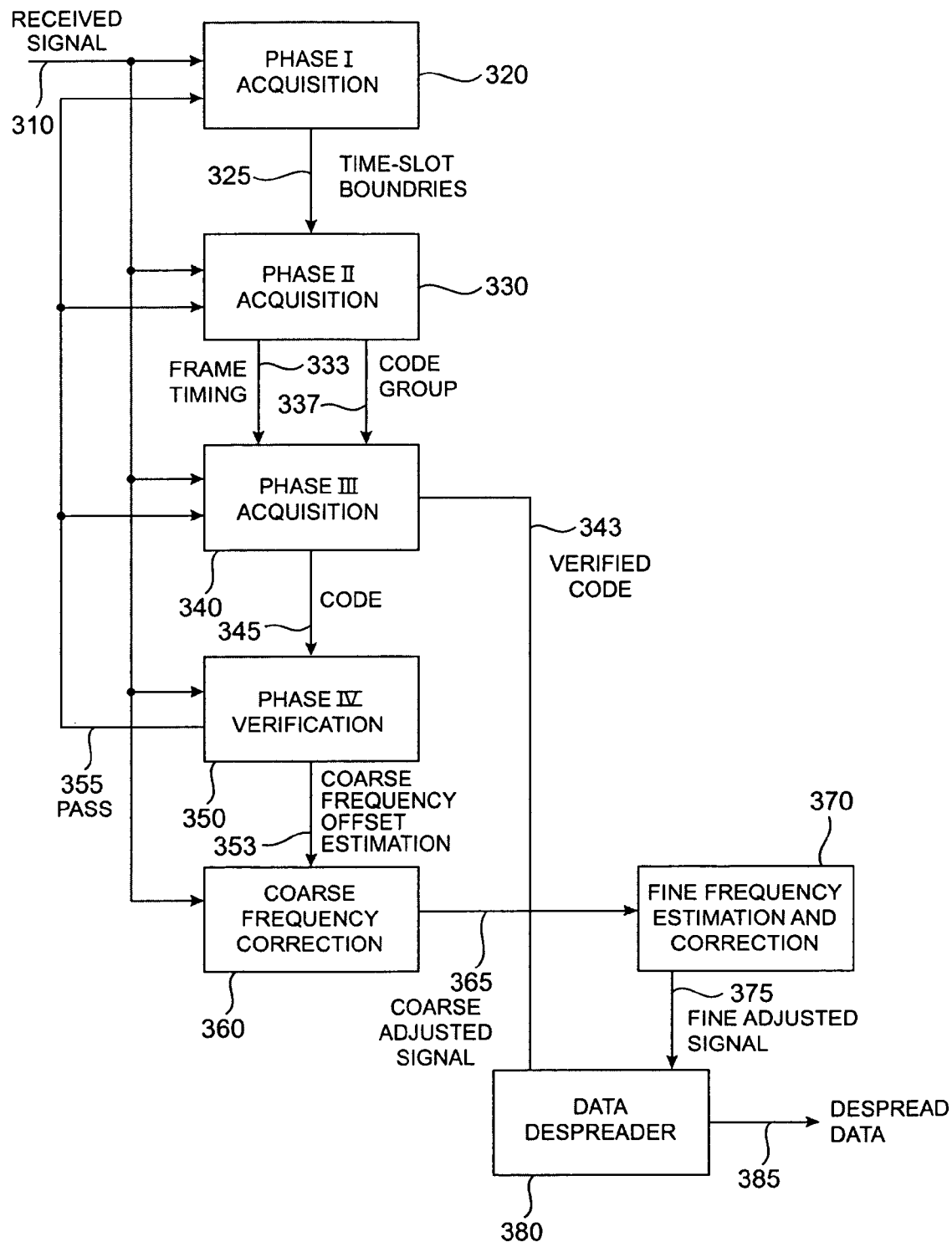
FIG. 3 is a block diagram of a portion of a receiver consistent with an embodiment of the present invention that may be used in terminal or handset.

FIG. 3 is a block diagram of a portion of a receiver consistent with an embodiment of the present invention that may be used in terminal or handset 140 or other wireless receiver. Included are a Phase I acquisition circuit 320, Phase II acquisition circuit 330, Phase III acquisition circuit 340, Phase IV verification circuit 350, coarse frequency correction circuit 360, fine frequency offset estimation and correction circuit 370, and data despreader circuit 380. This figure, as with all the included figures, is shown for exemplary purposes only, and does not limit either the claims or the possible embodiments of the present invention.

The Phase I acquisition circuit 320 receives a received signal on line 310 and determines the time slot boundaries 325 using the primary sync signals PSCH 210. A specific embodiment uses a matched filter to determine the time-slot boundary for a strongest base station signal. The Phase I acquisition circuit 320 provides the time slot boundary information 325 to the Phase II acquisition circuit 330.

With the time slot boundary information, the Phase II acquisition circuit 330 uses the secondary sync signals SSCH 220 to determine the frame timing 333, and further determines which of the 64 code groups 337 is being used by the base station 110. A specific embodiment uses a group of matched filters or correlators to determine the frame timing the code-group using the SSCH 220.

The Phase III acquisition circuit 340 receives the frame timing and code group information on lines 333 and 337 from the Phase II acquisition circuit 330. The Phase III acquisition circuit 340 then correlates the eight possible codes for that code group against the CPICH 230 to determine the code used by the base station 110. The Phase III acquisition circuit 340 provides this code on line 345 to the Phase IV verification circuit 350 and, once the code is verified, to the data despreader 380 on line 343.

The Phase IV verification circuit 350 verifies (or disproves) that the code identified by the Phase III acquisition circuit 340 is likely the code that is being used by the base station 110. After a code is verified, a pass signal is provided on line 355 to the Phase I acquisition circuit 320, Phase II acquisition circuit 330, and Phase III acquisition circuit 340. These circuits may then cease their respective acquisition functions until the signal from the base station 110 is lost or otherwise handed off.

In order to reduce errors caused by the difference in frequency between the transmitted signal and a local reference, the Phase IV verification circuit 350 performs a frequency correction, the result of which is a coarse frequency offset estimation signal on line 353. This coarse frequency offset estimation 353 is received by the coarse frequency correction circuit 360. The coarse frequency correction circuit 360 multiplies the received signal on line 310 with the complex conjugate of the coarse frequency offset estimation on line 353. This multiplication results in a coarse adjusted signal on line 365, which is a chip-by-chip frequency adjusted signal. The coarse adjusted signal on line 365 is received by the fine frequency offset estimation and correction circuit 370.

The fine frequency correction circuit 370 further refines the coarse adjustment, and provides a fine adjusted signal on line 375. The fine adjusted signal 375 is provided to the data despreader circuit 380.

The data despreader circuit 380 receives the verified code 343 from the phase acquisition circuit 340, as well as the fine adjusted signal on line 375 from the fine frequency offset estimation and correction circuit 370. The data despreader circuit 380 despreads the fine adjusted signal on line 375 using the verified code on line 343, as well as a unique handset identifying code, to provide a despread data signal on line 385.

When data is initially despread by the data despreader 380, the coarse and fine frequency corrections act to compensate for the frequency difference between the received signal and a local reference or oscillator, that is, the input signal is derotated. The local reference may a voltage controlled oscillator (VCO) or other periodic reference source, which is included in a phase-locked loop in a specific embodiment. After signal acquisition, the phase-locked loop acts to reduce the frequency difference between the received signal and the VCO. As the frequency difference is reduced, the frequency correction provided by the coarse and fine frequency correction signals is similarly reduced. In a specific embodiment, these functions continue after signal acquisition. In other embodiments, one or both of these functions may cease after signal acquisition or other appropriate time, for example, when the frequency difference or error is sufficiently reduced.

Figure 4:
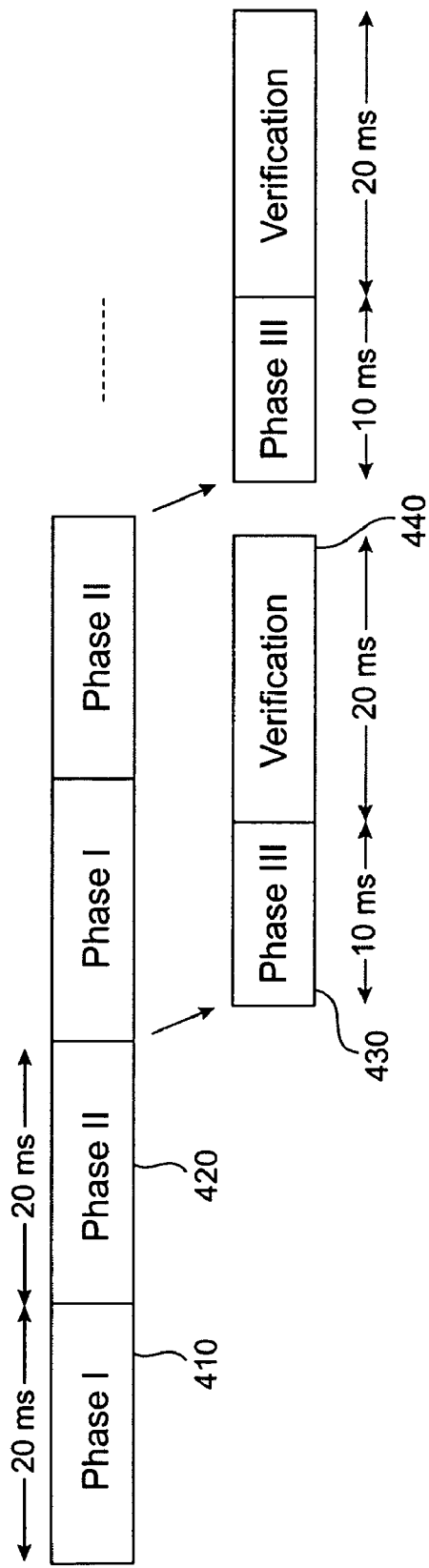
FIG. 4 is a timing diagram showing the timing relationships between Phase I acquisition, Phase II acquisition, Phase III acquisition, and Phase IV verification.

FIG. 4 is a timing diagram showing the timing relationships between Phase I acquisition 410, Phase II acquisition 420, Phase III acquisition 430, and Phase IV verification 440, according to an embodiment of the present invention. Specifically, Phase I acquisition 410 and Phase II acquisition 420 are performed serially and in parallel with Phase III acquisition 430 and Phase IV verification 440. In a specific embodiment, Phase I acquisition 410 takes approximately 20 milliseconds, and is followed by Phase II acquisition 420, which also takes 20 milliseconds. After this is complete, Phase III acquisition 430 and Phase IV verification 440 begin, while Phase I acquisition begins again. Phase III acquisition 410 takes approximately 10 milliseconds, while Phase IV verification 440 is approximately 20 milliseconds in duration.

Again, in this way Phase III acquisition and verification can occur in parallel with Phase I acquisition and Phase II acquisition, which occur in series. By having the Phase III acquisition and verification in parallel with Phase I and II acquisitions, the total acquisition time is reduced relative to a fully serial process. Also, by leaving Phase I and II acquisitions in series, the circuit complexity is reduced as compared to a fully parallel process. Thus, embodiments of the present invention provide a novel sequence of performing the tasks necessary to acquire a WCDMA signal.

Again, a problem that arises during the initial acquisition of a base station's signal for WCDMA terminals is error in the terminal's clock signal frequency. The base station 110 operates at a frequency near 2.0 GHz as specified by WCDMA requirements. The terminal 140 operates at a frequency very near that of the base station, but there is typically a tolerance or error associated the frequency of its clock circuit. For example, while a base station's clock may be very accurately tuned to the specified frequency, lower cost handsets 140 may use crystals or other periodic signal generators having 2 or 5 PPM frequency tolerances to generate a reference signal for the handset's phase-locked loop. It is desirable that the requirement for the frequency accuracy of a terminal's crystal or other clock generator be as relaxed as possible to lower cost and to improve robustness. After initial acquisition is complete, the terminal or handset 140 can correct the frequency of its VCO or local reference by synchronizing to the signal being received from the base station 110. Until that time though, the receiver must rely on its own clock signal.

These frequency errors degrade performance of receiving circuits such as the Phase III acquisition and Phase IV verification circuits 340 and 350 during initial acquisition by a WCDMA terminal. A 5 PPM frequency error in the clock signal in the terminal results in approximately a 10 kHz frequency offset. At 2 GHz, a 5 PPM error results in one cycle of drift at a frequency of (2 G)*(5/1M), which is equal to 10 kHz, which is one cycle every 100 usec. Thus, coherent correlation is limited to about 33 usec or 128 chips for WCDMA to avoid a phase roll beyond 120 degrees, which suppresses signal gain by 1.5 dB.

Figure 5:
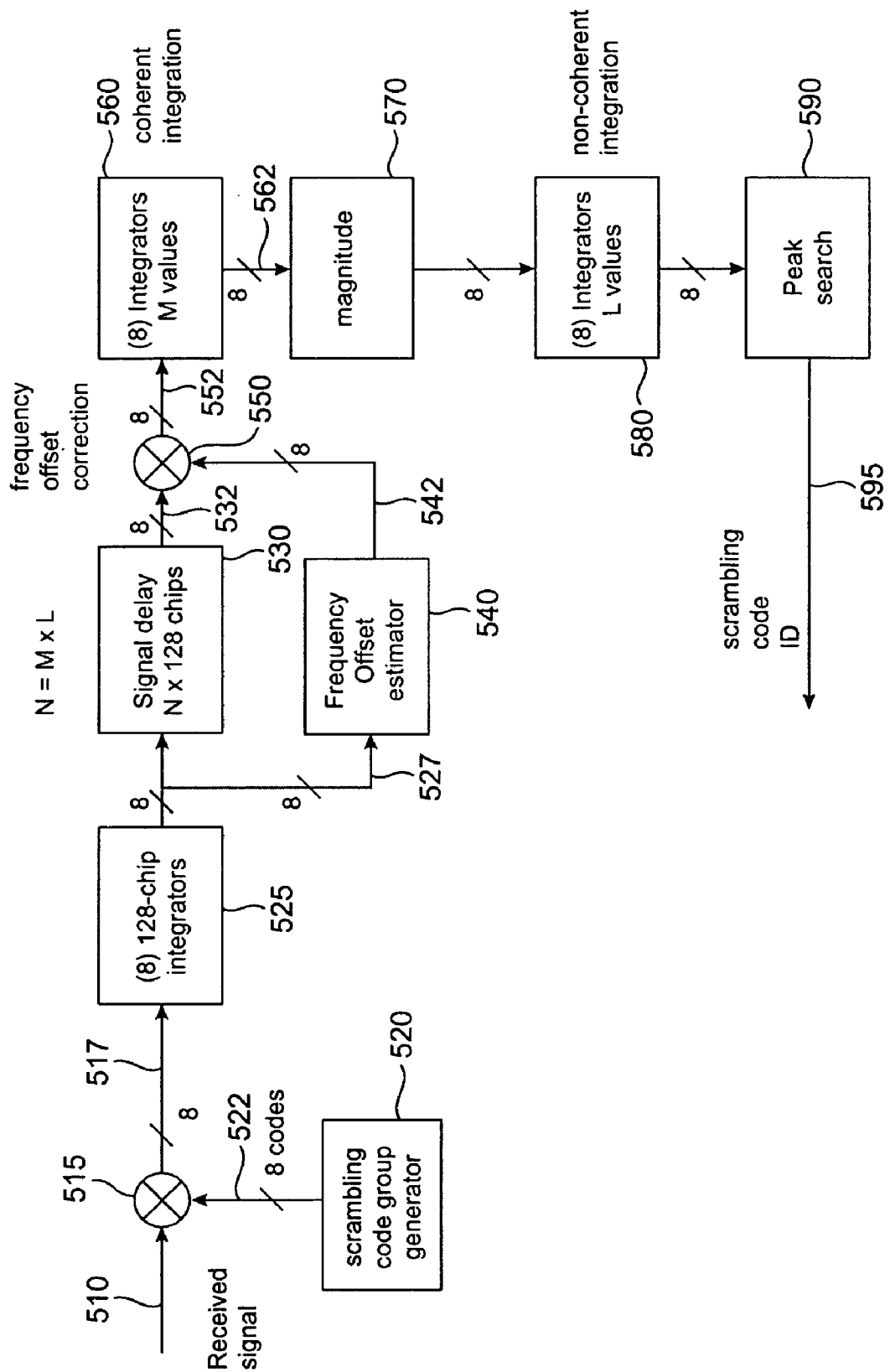
FIG. 5 is a block diagram of a circuit which may be used as the Phase III acquisition circuit in FIG. 3.

FIG. 5 is a block diagram of a circuit which may be used as the Phase III acquisition circuit 340 in FIG. 3, or similar circuits in embodiments of the present invention. This circuit implements frequency correction to mitigate the problem of frequency offset during Phase III scrambling code acquisition. Frequency correction permits longer coherent combining periods to improve gain.

Included in this figure are a scrambling code group generator 520, peak search detector 590, and eight of each of the following: a despreader multiplier 515, 128-chip integrator 525, signal delay 530, frequency offset estimator 540, complex multiplier 550, coherent integrator 560, magnitude generator 570, and non-coherent integrator 580. All signals are complex until the magnitude generator 570.

A signal is received on line 510 by despreader multiplier 515. The 8 codes in the code group identified by the Phase II acquisition circuit 330 are provided to the despreader multipliers 515 by the scrambling code group generator 520. Each despreader multiplier 515 multiplies or modulates the received signal on line 510 with one of the 8 codes. The outputs of despreader multipliers 515 are correlated or accumulated using complex addition over 128 chips by integrators 525, resulting in a despread symbol or sample. This correlation provides a processing gain of 21 dB. In this way, the spread received signal is despread.

The outputs of integrators 525 are delayed by signal delay buffer circuit 530. An estimate of the offset frequency is made using the outputs of integrators 525 by frequency offset estimators 540. This estimation is applied to the signals delayed by delay circuits 530 using complex multipliers 550. After this frequency correction, several symbols, for example 5, can be combined coherently by coherent integrators 560 to provide 7 dB of additional processing gain. In other embodiments, other number of symbols may be combined, but this coherent combining is limited by residual frequency error and random Doppler effects due to signal fading.

The magnitude of these integrator values are determined by the magnitude circuit 570 and accumulated by integrators 580. Since only the magnitude is provided by magnitude circuit 570, integrators 580 are non-coherent integrators. Also, since only the magnitudes are combined, the gain is only approximately one-half the gain provided by coherent combining.

Peak search detector 590 detects the maximum value of the eight integrators 580. This maximum value corresponds to one of the codes supplied by the scrambling code group generator 520. This code is likely the code used by the base station 120 to spread the received signal 510. This scrambling code identification is provided on line 595 to a Phase IV verification circuit, for example the Phase IV verification circuit 350 in FIG. 3.

It should be noted that a frequency offset correction should not be applied globally in the handset or terminal 140 until after signal verification is completed to avoid erroneous corrections to the terminal's primary reference. Accordingly, this circuit generates a frequency offset estimate that is used for the signal being processed.

Figure 6A:
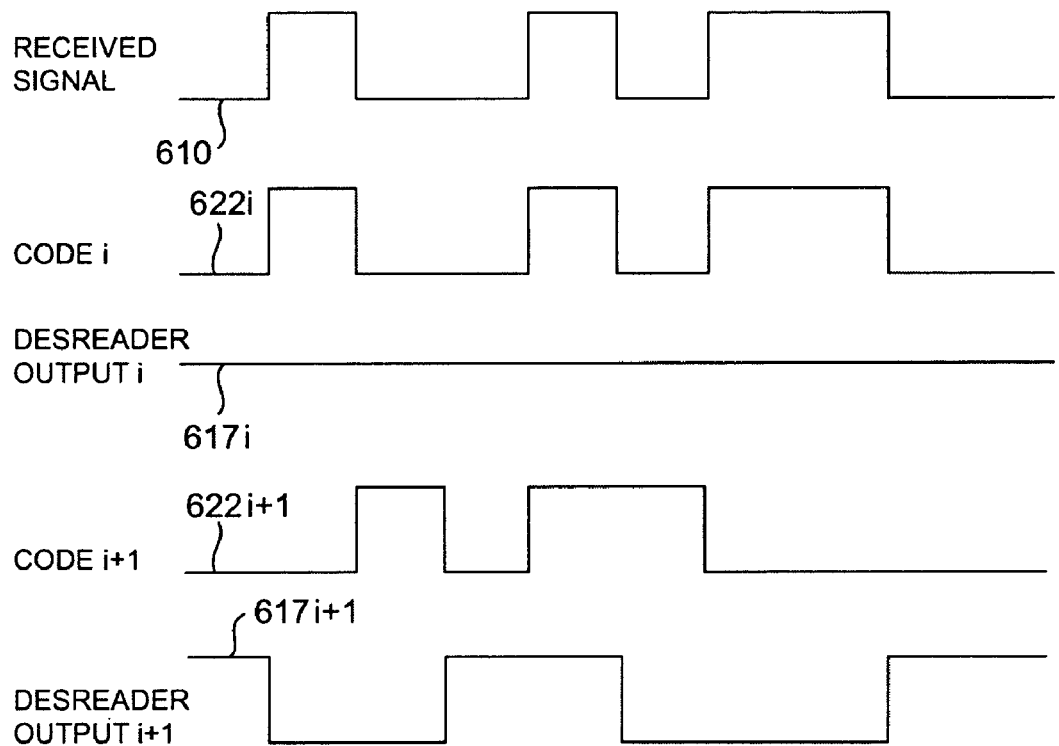
FIGS. 6A-6C are timing and vector diagrams illustrating the operation of the circuit shown in FIG. 5.
Figure 6B:
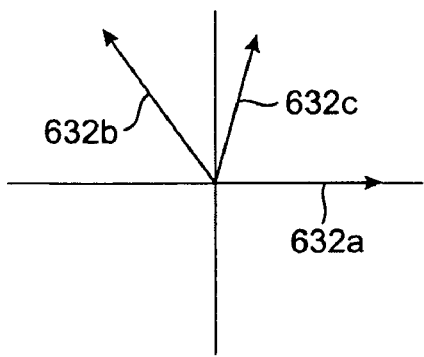
Figure 6C:
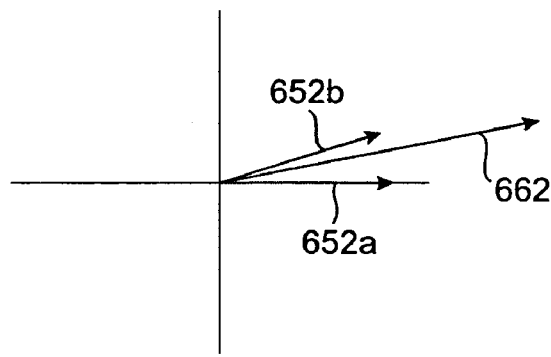

FIGS. 6A-6C are timing and vector diagrams illustrating the operation of the circuits shown in FIG. 5. FIG. 6A is a timing diagram including an example of a received signal 610, code(i) 622(i), which corresponds to the code used by the base station 110, its corresponding descrambler output 617(i), code(i+1) 622(i+1), which is a code not used by the base station 110, and its corresponding despreader output(i+1) 617(i+1). In this example, only 10 chips of a signal are shown for simplicity.

Received signal 610 is received by despreader multiplier 515. Code(i) 622(i) is provided by the scrambling code group generator 520. This code(i) 622(i) is timed using the frame and time slot boundary information determined by the Phase I and II acquisition circuits 320 and 330. Since the CPICH portion of the received signal 610 consists of all ones, the received signal 610 correlates with the code(i) 622(i), and is despread as despreader output 617(i), which is a symbol having a value of "1." Other codes, such as code(i+1) 622(i+1), do not correlate with the received signal 610, and result in the spread output values which appear to be noise, such as despreader output(i+1) 617(i+1). As can be seen, despreader output(i+1) 617(i+1) has a cumulative value that is only one half that of despreader output(i) 617(i). As these values are further accumulated, it becomes easier to separate the correlated code(i) 622(i) from the other codes such as code(i+1) 622(i+1).

Again, there is a difference in frequency between the received signal and the codes supplied by the scrambling code group generator 520. This difference in frequency accumulates as a phase error for successive symbols. FIG. 6B illustrates two despread symbols 632a and 632b which correspond to symbols provided at the output of signal delay block 530. If these symbols are accumulated or coherently integrated, the result is vector 632c. Accordingly, the frequency offset estimator 540 corrects, or at least reduces, the phase error on a bit-per-bit basis such that vectors 632b is brought at least more into line with vector 632b.

FIG. 6C illustrates two such symbols 652a and 652b provided at the output of complex multiplier 550. As can be seen in this example, the phase error has nearly been canceled. By reducing the phase error between these vectors, more symbols may be coherently integrated. These vectors are shown for exemplary purposes, and are not intended to illustrate actual performance of any specific embodiment of the present invention.

Vectors 652a and 652b are combined by the coherent integrator 516, resulting in vector 662. The magnitudes of these vectors may be further combined by magnitude generator 570 and accumulated by non-coherent integrators 580. Again, these 8 is values are peak detected by peak search block 590. The highest value corresponds to the scrambling code used by the base station 110.

As can be seen by inspection, the phase error reduction performed by frequency offset estimator 540 results in a larger magnitude of vector 662 as compared to 632c. This reduction in phase error allows for longer coherent integration times, thus increasing the gain. The increase in gain translates to greater receiver sensitivity and larger receiver dynamic range.

Figure 7:
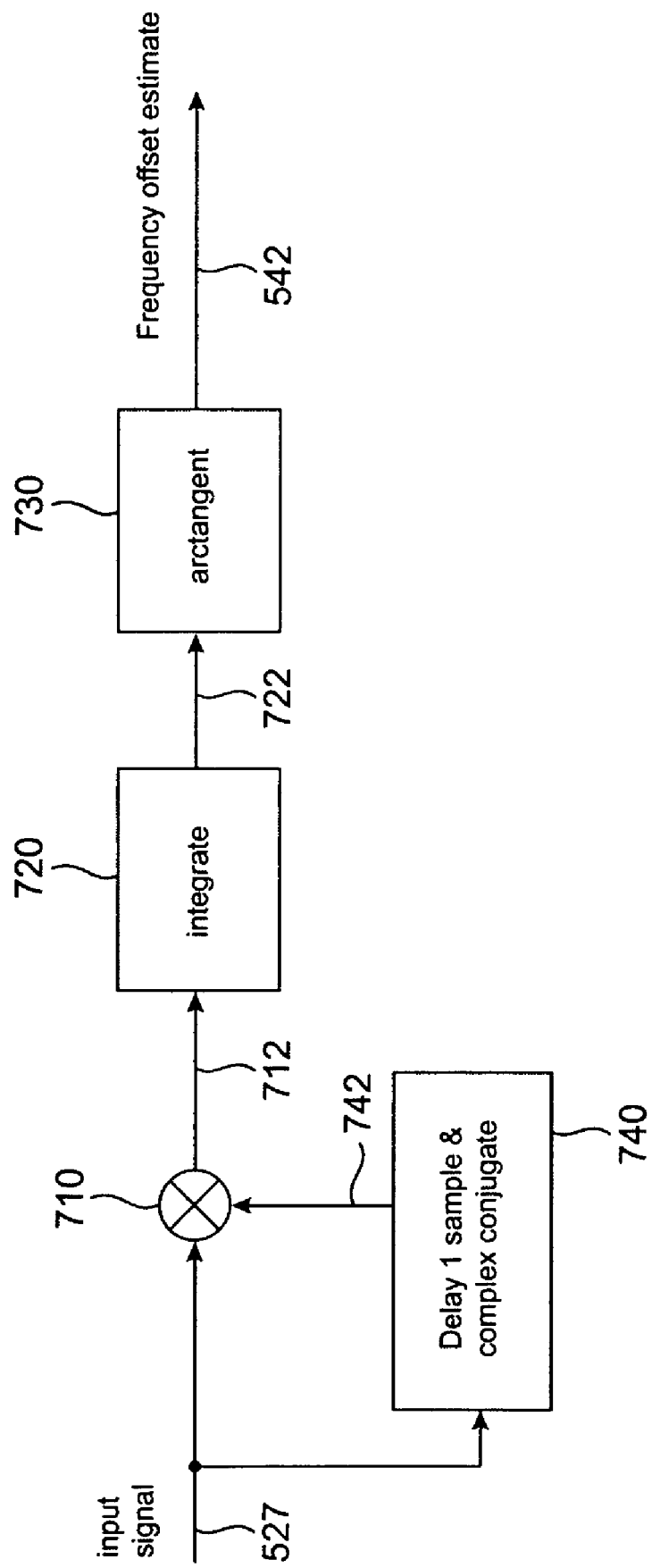
FIG. 7 is a block diagram of a frequency estimator that may be used as the frequency estimator in FIG. 5 or 14.

FIG. 7 is a block diagram of a frequency estimator that may be used as the frequency estimator 540 in FIG. 5 or as similar circuits in other embodiments of the present invention. Included are complex conjugate multiplier 710, integrator 720, arctangent circuit 730, and delay and complex conjugate circuit 740. This estimator takes the differential signal between adjacent symbols, and then accumulates those differential symbols. The arctangent of the accumulation is a phase which is used to reduce or eliminate the phase error of the samples or symbols that form the input signal on line 527. That is, this arctangent is proportional to the frequency offset, and with appropriate scaling and integration can be used to correct, that is, at least reduce the frequency offset that causes a rolling phase between the symbols formed by the 128-chip correlations.

Specifically, the input signal on line 527 is received by the complex conjugate multiplier 710. This input signal on line 527, which comprises a series of despread symbols or samples, is delayed by one symbol or sample period. The complex conjugate of each delayed symbol or sample is provided to the complex conjugate multiplier 710, the output of which is integrated by integrator 720. This integration may occur over several hundreds of symbols. The arctangent of this integration is a phase that is provided as the frequency offset estimate on line 542.

FIG. 8 represents a method of obtaining a frequency estimate that may be used to compensate for frequency differences between a signal transmitted by base station 110 and a local reference clock available to handset 140. In this example, an input signal to the frequency offset estimator comprises a series of despread symbols or samples 810. This series 810 is delayed by one symbol, resulting in the delayed symbols 820. The complex conjugate 830 of the delayed symbols 820 are taken, and this delayed symbols sequence is multiplied symbol by symbol with the input signal 810, resulting in the multiplied series 840. These products are integrated as sum 850, and the arctangent 860 is taken, resulting in a phase that may be used on a symbol per symbol basis to correct the phase error in the input signal 810.

If the despread symbols are expressed as equations 870, their complex conjugates are equations 880. Accordingly, the numerator of equation 850 can be expressed as equation 890. If the phase difference between each symbol is constant, for example, equal to θ as in equation 892, then equation 894 can be solved as θ. This angle θ may be scaled or directly applied to each symbol in the input signal 810 to remove or reduce its phase error.

Figure 9:
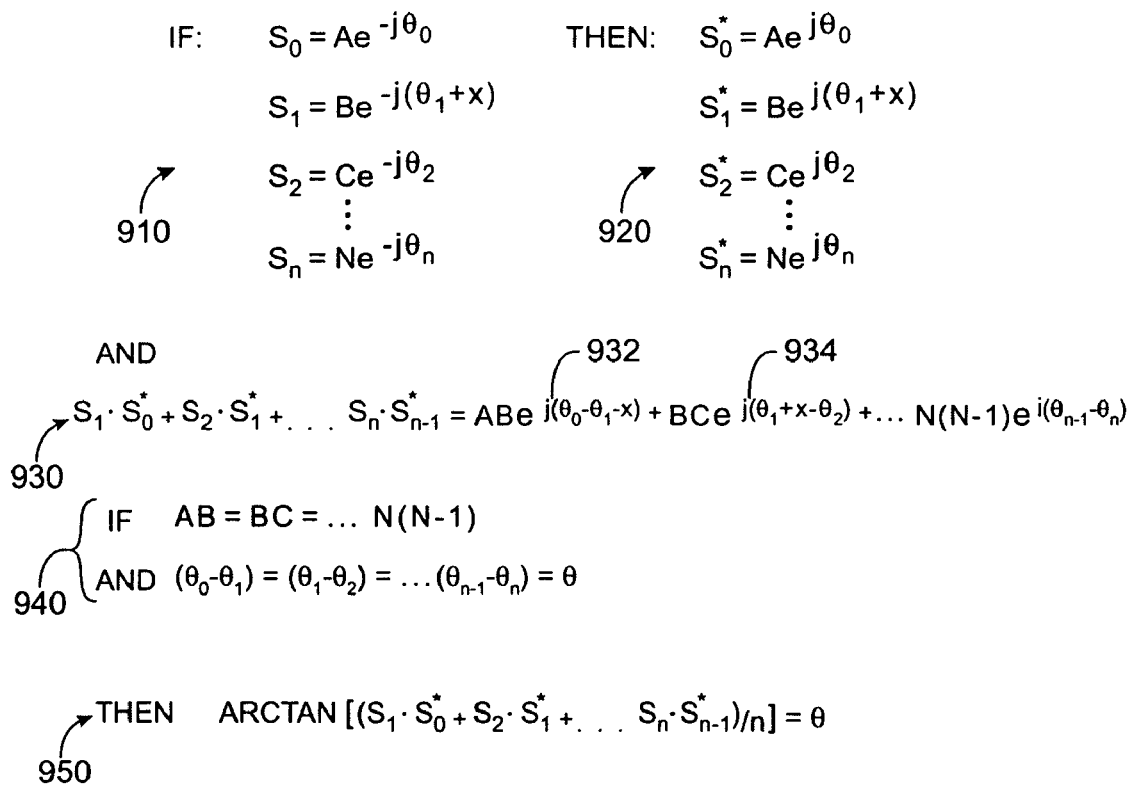
FIG. 9 illustrates the method of FIG. 8 in the presence of phase noise.

FIG. 9 illustrates the method of FIG. 8 in the presence of phase noise. While noise typically effects all symbols, in this simplified example only symbol $S_1$ has phase noise "x" in addition to its phase offset $\theta_1$. The complex conjugate of the values 910 are listed as values 920. Equation 930 shows the input signal multiplied with its delayed complex conjugate and accumulated. As can be seen, the noise contribution to products 932 and 934 tend to cancel when their terms are added. For example, where the products and phase errors meet the criteria shown as equations 940, the arctangent of the accumulated sequence is once again found to be θ by equation 950, thus the noise contributed by "x" is canceled. As can be seen, the desired signal having angle θ accumulates coherently, while the phase noise accumulates incoherently, that is, tends to cancel.

Figure 10A:
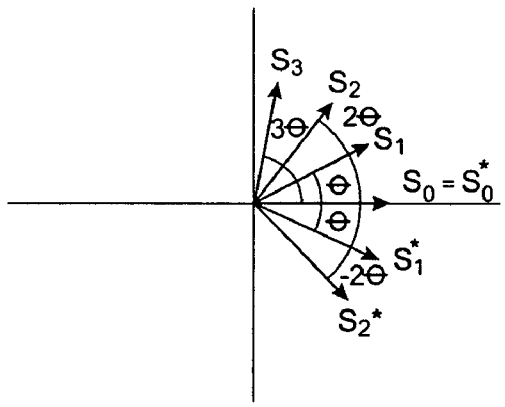
FIGS. 10A-10E are a vector analysis of a frequency estimator.
Figure 10B:
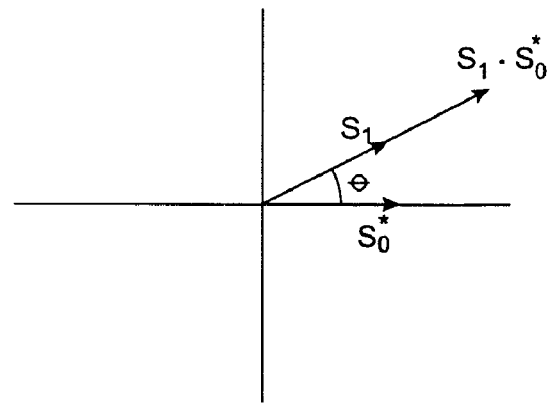
Figure 10C:
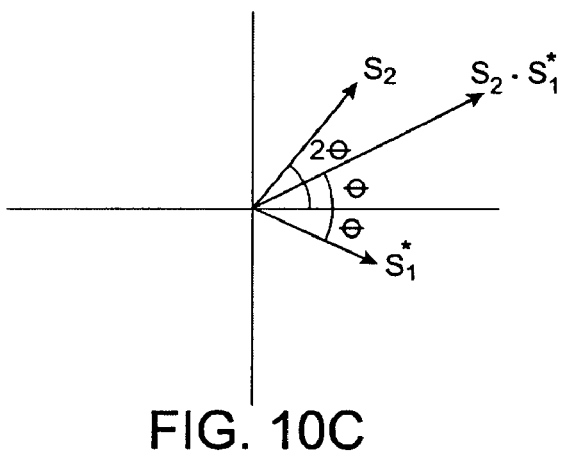
Figure 10D:
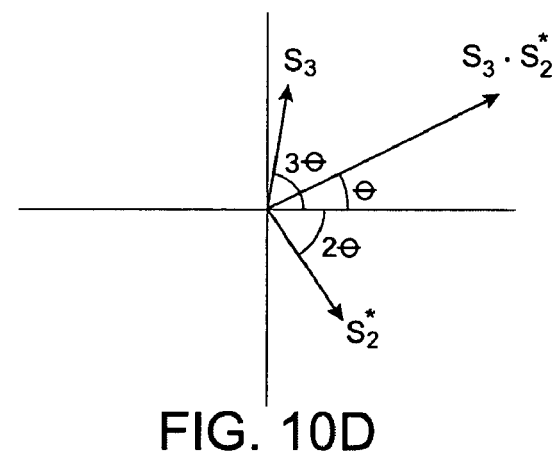
Figure 10E:
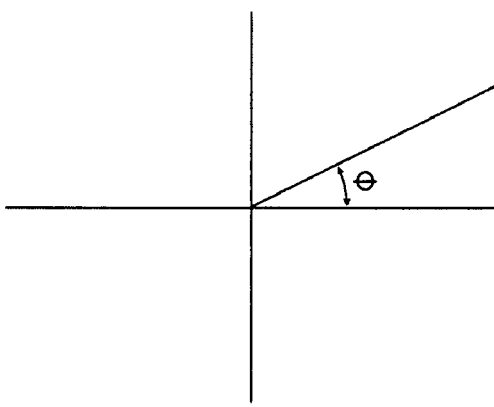

FIGS. 10A through 10E are a vector analysis of a frequency estimator, such as the frequency estimator shown in FIG. 7. In FIG. 10A, a sequence of four symbols of a signal received by the frequency offset estimator is shown as $S_0$-$S_4$. The phase error between each symbol is θ, such that each symbol rolls by an additional phase error θ. The complex conjugate of these vectors are also shown. FIG. 10B shows the first product accumulated by integrator 720, while FIGS. 10C and 10D illustrate the following two. FIG. 10E illustrates the accumulated sequence at the output of integrator 720. The arctangent of this vector is the extracted value θ, which may be scaled or directly applied to each symbol to compensate for its phase error.

A network can support more terminals or handsets 140 if base station 110 transmits signals using more than one antenna 120. For example, two or more antennas 120 may be used. In that case, the code information sent by each antenna is different.

Figure 11:
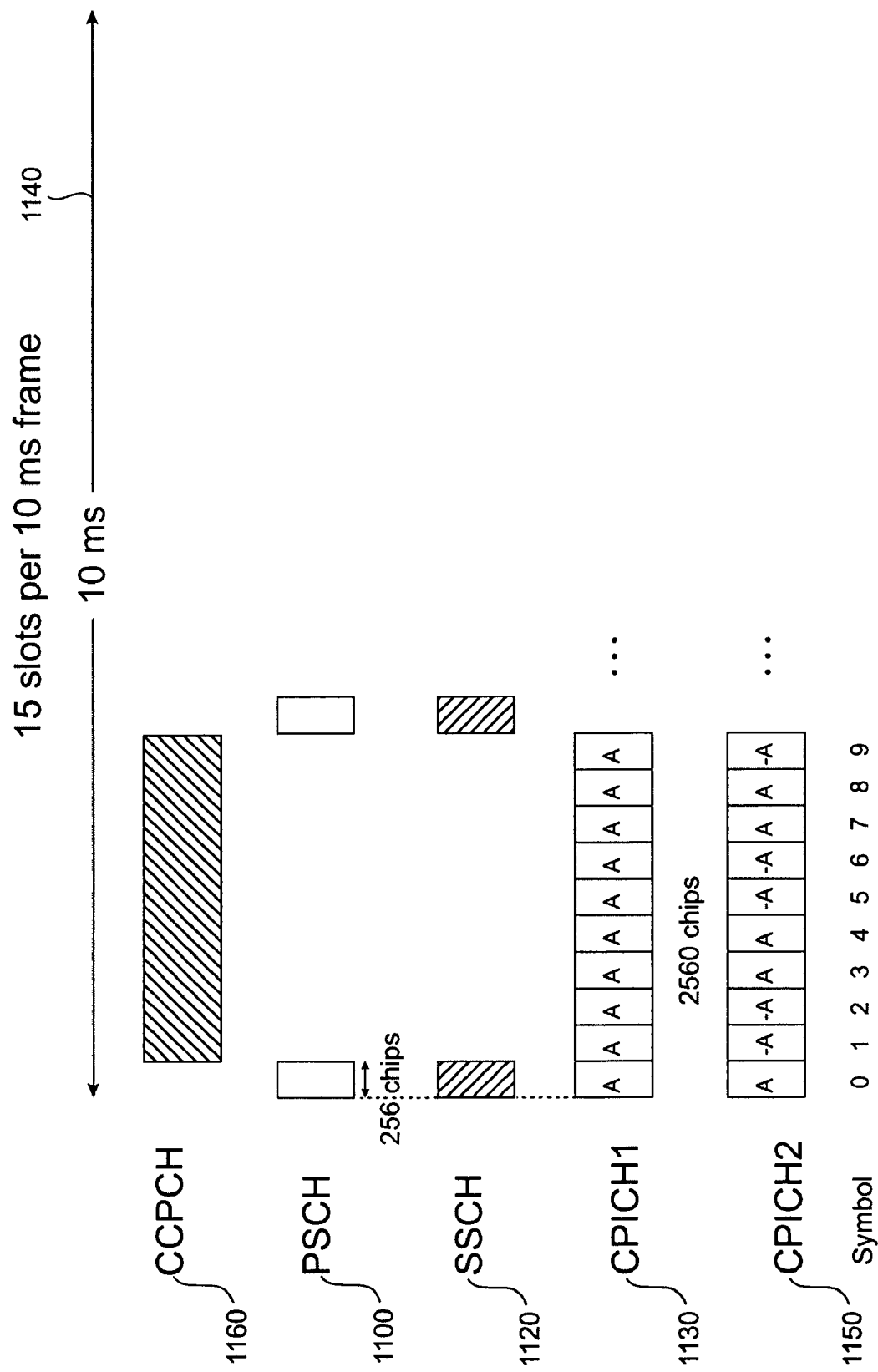
FIG. 11 is a representation of synchronizing and code information that forms parts of two WCDMA signals transmitted by two antennas.

FIG. 11 is a representation of synchronizing and code information that forms parts of two transmitted WCDMA signals sent by two antennas 120. Included are a number of primary sync signals 1110, secondary sync signals 1120, common pilots channel signals 1130 and 1150, and a common control physical channel (CCPCH), 1160 occurring in a frame 1140.

Each frame 1140 is 10 milliseconds in duration. As before, there are 15 slots per frame, and each slot includes one primary sync 1110 of 256 chips, one secondary sync 1120, also of 256 chips, one CPICH1 1130 and one CPICH2 1150, each having 2560 chips, and a CCPCH 1160 overlapping symbols 1-9.

The primary sync 1110 signal is made up of identical 256 chips sequences, and is used to convey time slot boundary information. Each secondary sync signal 1120 is simultaneous with the primary sync signal and is made up of one of 16 different 256 chips sequences, which are varied in one of 64 different patterns that repeat each frame. Each of these 64 patterns correspond to one of these 64 code groups used. The CPICH1 signal 1130 is an all ones signal that is scrambled by one of the 8 codes in the code group. The CPICH2 signal 1150 is an alternating "1" "−1" signal that is also scrambled. The CCPCH signal 1160 uses a 256-chip Walsh code that consists of 128 "1's" followed by 128 "−1's". The terminal or handset 140 receives the primary sync signal 1110, secondary sync signal 1120, CPICH1 signal 1130, and the CPICH2 signal 1150, and determines the time slot boundary timing, code group, and code used by the base station 110.

The alternating "1" and "−1" pattern of CCPCH 1160 means that it can interfere if consecutive symbols are accumulated throughout the time slot. Accordingly, an embodiment of the present invention only uses correlations that are done when CCPCH 1160 is not transmitted.

Figure 12:
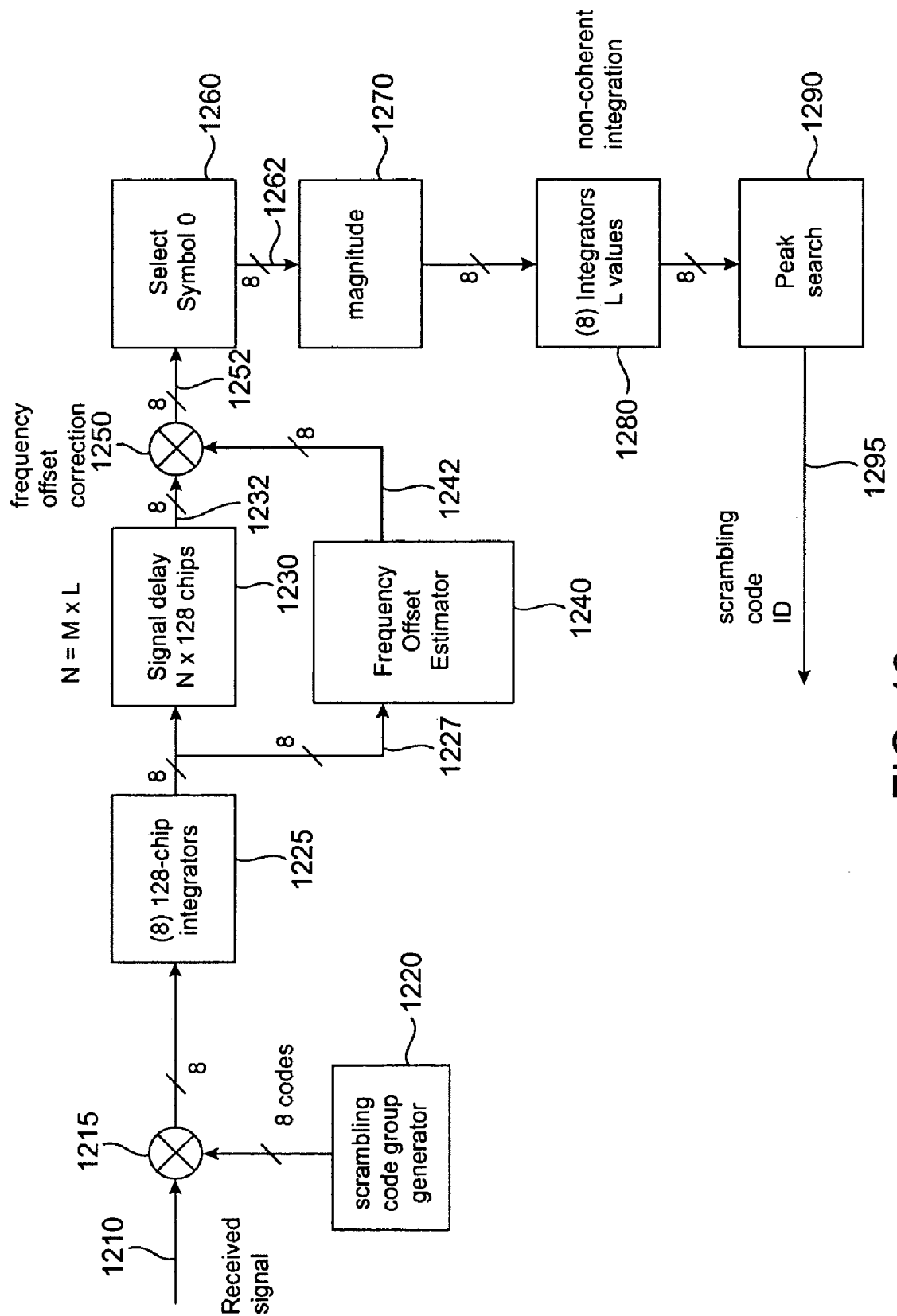
FIG. 12 is a block diagram of an alternative circuit which may be used as the Phase III acquisition circuit in FIG. 3, or similar circuits in embodiments of the present invention.

FIG. 12 is a block diagram of a circuit which may be used as the Phase III acquisition circuit 340 in FIG. 3, or similar circuits in embodiments of the present invention, which uses only correlations made when the CCPCH signal is not transmitted. Included are a scrambling code group generator 1220, peak search detector 1290, and eight of each of the following: despreader multiplier 1215, 128-chip integrator 1225, signal delay 1230, frequency offset estimator 1240, complex multiplier 1250, symbol zero selector 1260, magnitude circuit 1270, and non-coherent integrator 1280. All signals are complex until they reach the magnitude generator 1270.

A signal is received on line 1210 by despreader multiplier 1215. The 8 codes in the code group identified by the Phase II acquisition circuit 330 are provided to the despreader multipliers 1215 by the scrambling code group generator 1220. Each despreader multiplier 1215 multiplies or modulates the received signal on line 1210 with one of the 8 codes. The outputs of despreader multipliers 1215 are correlated or accumulated using complex addition over 128 chips by integrators 1225 resulting in a despread value. In this way, the spread received signal is despread.

The outputs of integrators 1225 are delayed by signal delay buffer circuit 1230. An estimate of the offset frequency is made using the outputs of integrators 1225 by frequency offset estimator 1240. This estimation is applied to the signal delayed by delay circuit 1230 using complex multipliers 1250. After this frequency correction, the first symbol from each time slot selected by symbol zero select circuit 1260. Again, only the first symbol of each time slot is used since that is when the CCPCH signal 1160 is not transmitted.

The magnitude of these values are determined by the magnitude circuit 1270 and accumulated by integrators 1280. Since only the magnitude is provided by magnitude circuit 1270, integrators 1280 are non-coherent integrators. Peak search detector 1290 detects the maximum value of the eight integrators 1280. This maximum value corresponds to one of the codes supplied by the scrambling code group generator 1220. This code is likely the code used by the base station 120 to spread the received signal 1210. This scrambling code identification is provided on line 1295 to a Phase IV verification circuit, for example the Phase IV verification circuit 350 in FIG. 3.

Figure 13:
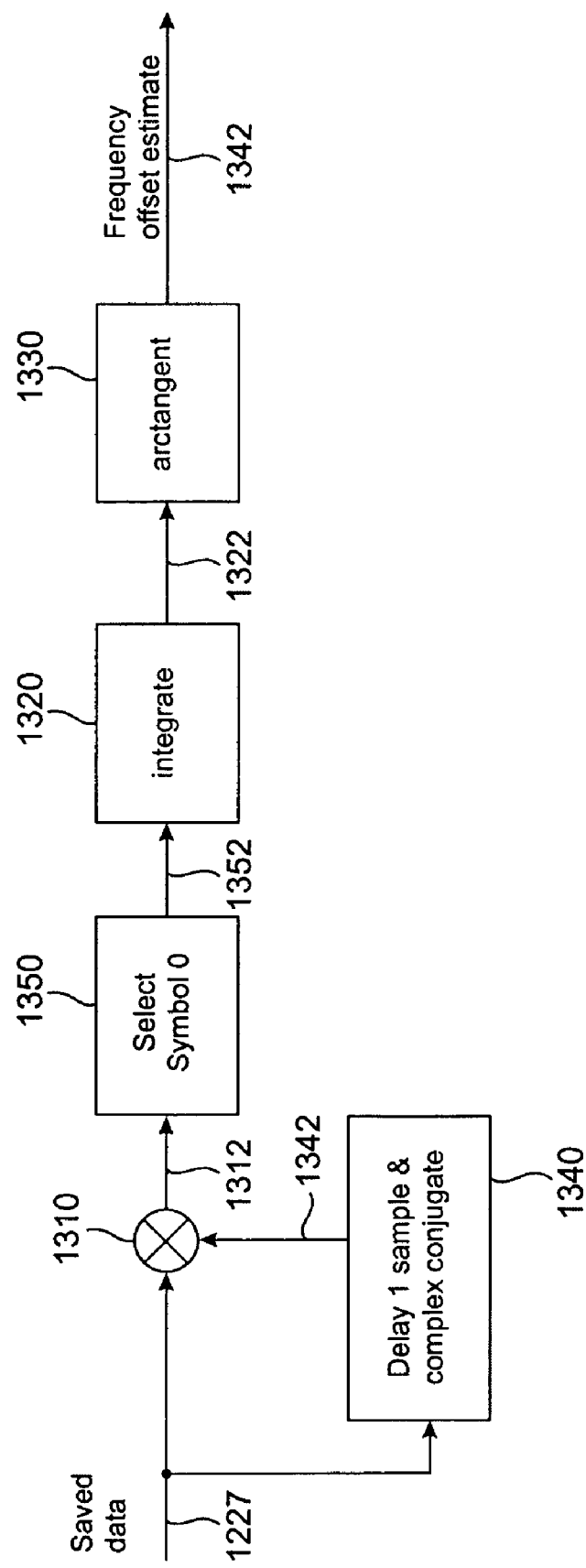
FIG. 13 is a block diagram of a frequency estimator that may be used as the frequency estimator in FIG. 12.

FIG. 13 is a block diagram of a frequency estimator that may be used as the frequency estimator 1240 in FIG. 12 or as a similar circuit in other embodiments of the present invention. Included are complex conjugate multiplier 1310, integrator 1320, arctangent circuit 1330, delay and complex conjugate circuit 1340, and symbol zero select circuit 1350. This estimator takes the differential signal the first two 128 samples in each time slot, and then accumulates those differential signals. The arctangent of the accumulation is a phase which is used to reduce or eliminate the phase error of the samples or symbols that form the input signal on line 1227. That is, this arctangent is proportional to the frequency offset, and with appropriate scaling and integration can be used to correct this frequency offset that causes a rolling phase between the symbols or samples formed by the 128-chip correlations.

Specifically, the input signal on line 1227 is received by the complex conjugate multiplier 1310. This input signal on line 1227, which comprises a series of despread symbols or samples, is delayed by one symbol or sample period. The complex conjugate of each delayed symbol or sample is provided to the complex conjugate multiplier 1310. The first product output for each time slot are selected by the select symbol zero circuit 1350, the output of which is integrated by integrator 1320. This integration may occur over several hundreds of time slots. The arctangent of this integration is a phase that is provided as the frequency offset estimate on line 1342.

Since symbol zero is 256-chips in duration, two 128-chip correlations can be performed when CCPCH 1160 is not transmitted. This means that one 128 chip correlation multiplied by the complex conjugate of its previous 128 chip correlation may be integrated by integrator 1320. Accordingly, one differential phase calculation for each 2560-chip timeslot is used to generate the frequency offset estimation on line 1342.

Figure 14:
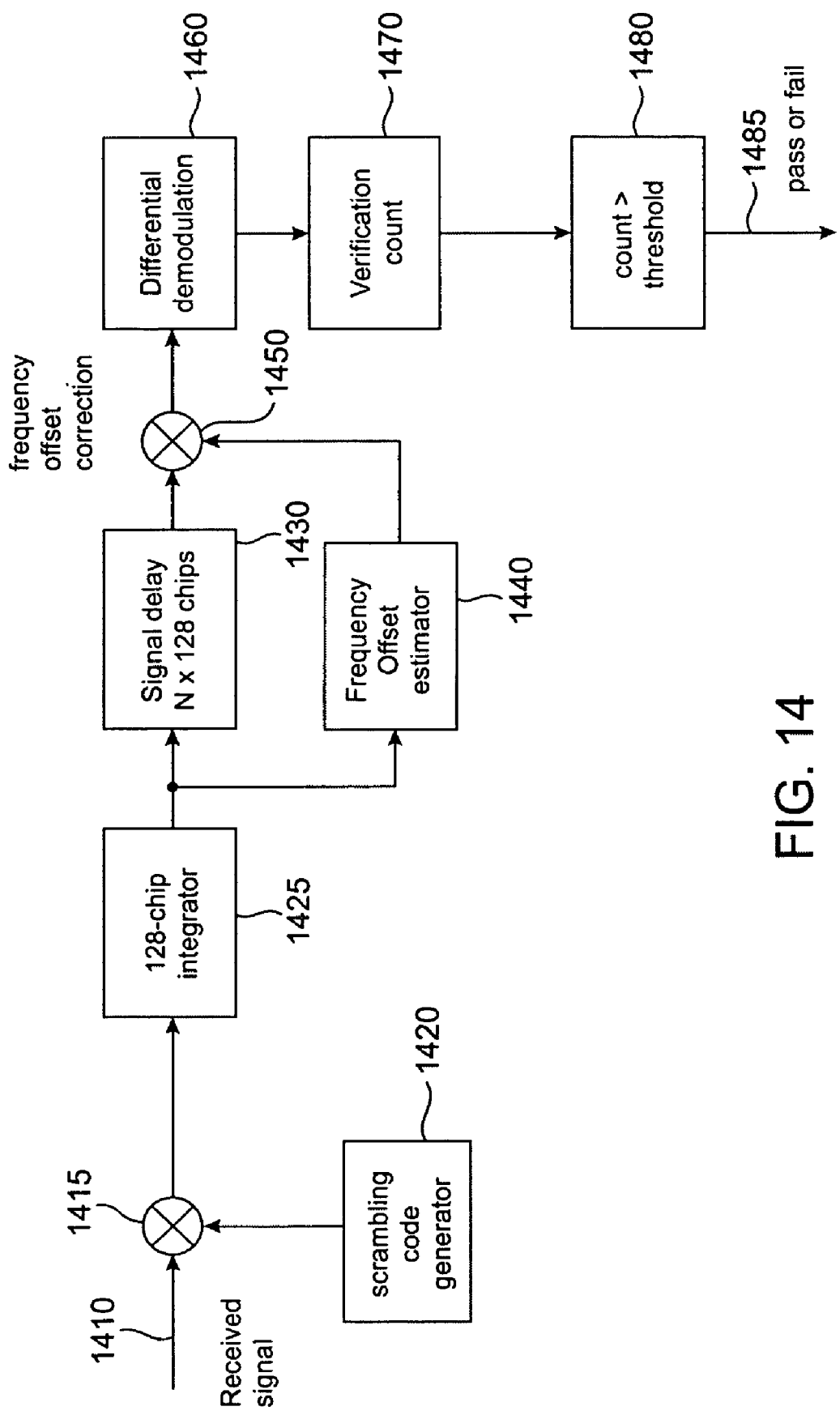
FIG. 14 is a block diagram of a Phase IV verification circuit which may be used as the Phase IV verification circuit in FIG. 3.

FIG. 14 is a block diagram of a Phase IV verification circuit which may be used as the Phase IV verification circuit 350 in FIG. 3 or as a similar verification circuit in other embodiments of the present invention. Included are despreader multiplier 1415, scrambling code generator 1420, integrator 1425, delay circuit 1430, frequency offset estimator 1440, complex multiplier 1450, differential demodulator 1460, verification counter 1470, and counter threshold detector 1480.

A received signal on line 1410 is provided to despreader multiplier 1415. Scrambling code generator 1420 provides the code identified by the Phase III code acquisition circuit 340, such as was shown in FIG. 5 and FIG. 12. Despreader multiplier 1415 multiplies the received signal 1410 with the scrambling code provided by scrambling code generator 1420. Integrator 1425 accumulates the values output by despreader multiplier 1415 for 128 chips, resulting in a series of despread symbols or samples. These despread symbols are provided to signal delay circuit 1430 and frequency offset estimator 1440. The frequency offset estimator may be the same or similar to the circuits shown in FIG. 7 and FIG. 13. The output of the frequency offset estimator 1440 is used to correct the phase error of the symbols in the delay circuit 1430. The output of the frequency offset estimator 1440 may be used as the coarse frequency offset estimation on line 353 in FIG. 3. The complex conjugate of this signal may be multiplied with the received signal, for example by the coarse frequency correction circuit 360, resulting in the coarse adjusted signal on line 365 in FIG. 3.

Complex multiplier 1450 multiplies the delayed symbols with the frequency offset estimation and provides an output to the differential demodulator 1460. Differential demodulator 1460 demodulates the phase corrected samples to baseband. The output of demodulator 1460 ideally comprises a string of ones. The ones and the total number of outputs are counted by verification counter 1470. The number of ones as a percentage of total outputs is compared to a threshold percentage by threshold detector 1480. If the percentage of ones output by differential demodulator 1460 is higher than the threshold percentage, the code supplied by scrambling code generator 1420 is verified as being the code used by the base station 110. Alternately, if the percentage of ones output by differential demodulator 1460 is lower than the threshold percentage, the code supplied by scrambling code generator 1420 is determined to not be the code used by the base station 110.

A noise signal results in 50 percent of the output of the differential demodulator 1460 being ones. On the other hand, 100 percent accuracy is an unnecessarily rigorous criteria. Accordingly, the threshold can be set at an appropriate level between 50 and 100 percent. For example, in a specific embodiment of the present invention the threshold is set at 75 percent. In another embodiment, the threshold percentage is simply set significantly away from either 50 or 100 percent.

When the criteria is met and the code is found, the Phase I, Phase II, and Phase III acquisition activities may cease until the signal is lost and needs to be reacquired, or is handed off to another base station.

Figure 15:
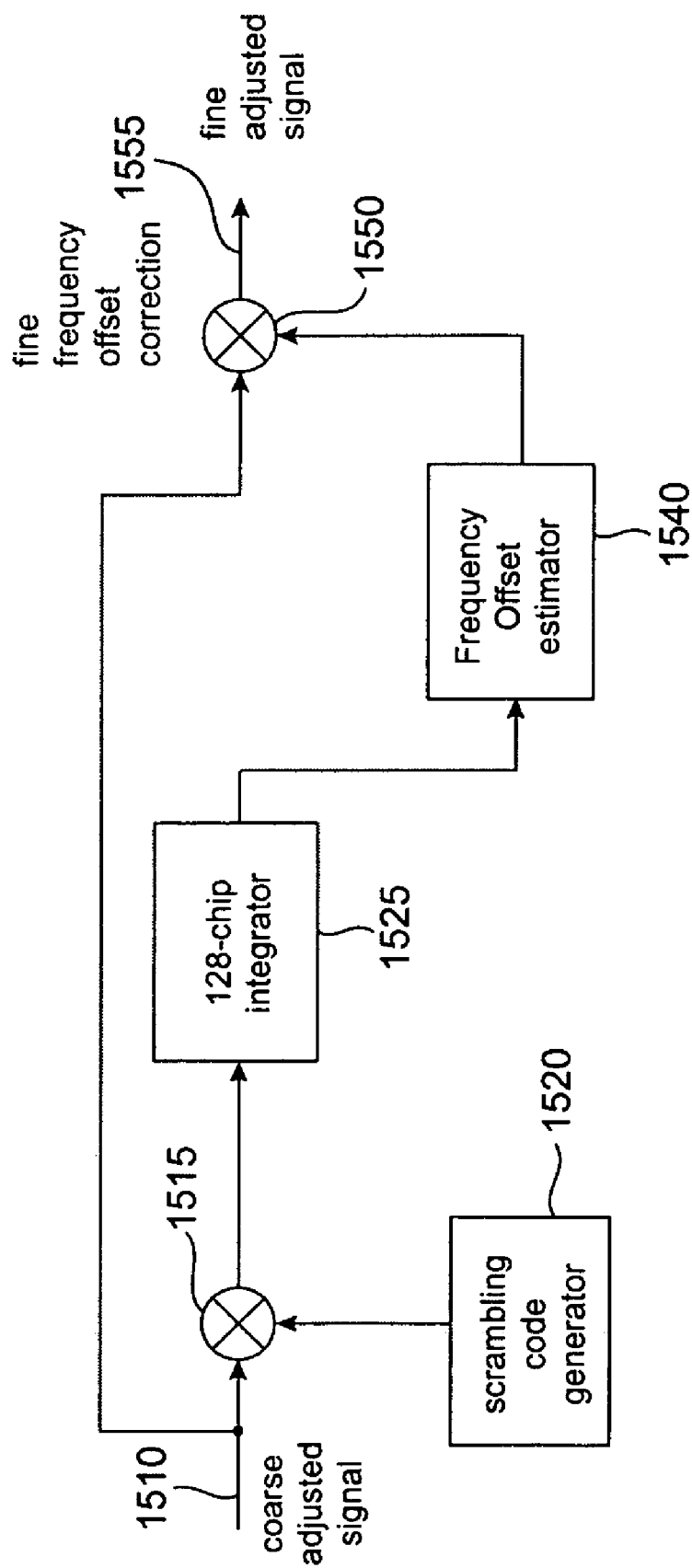
FIG. 15 is a block diagram of a fine frequency offset estimation and correction circuit that may be used as the fine frequency offset estimation and correction circuit in FIG. 3.

FIG. 15 is a block diagram of a fine frequency offset estimation and correction circuit that may be used as the fine frequency offset estimation and correction circuit in FIG. 3, or similar circuits in other embodiments of the present invention. Included are despreader multiplier 1515, scrambling code generator 1520, integrator 1525, frequency offset estimator 1540, and complex multiplier 1550.

Figure 16:
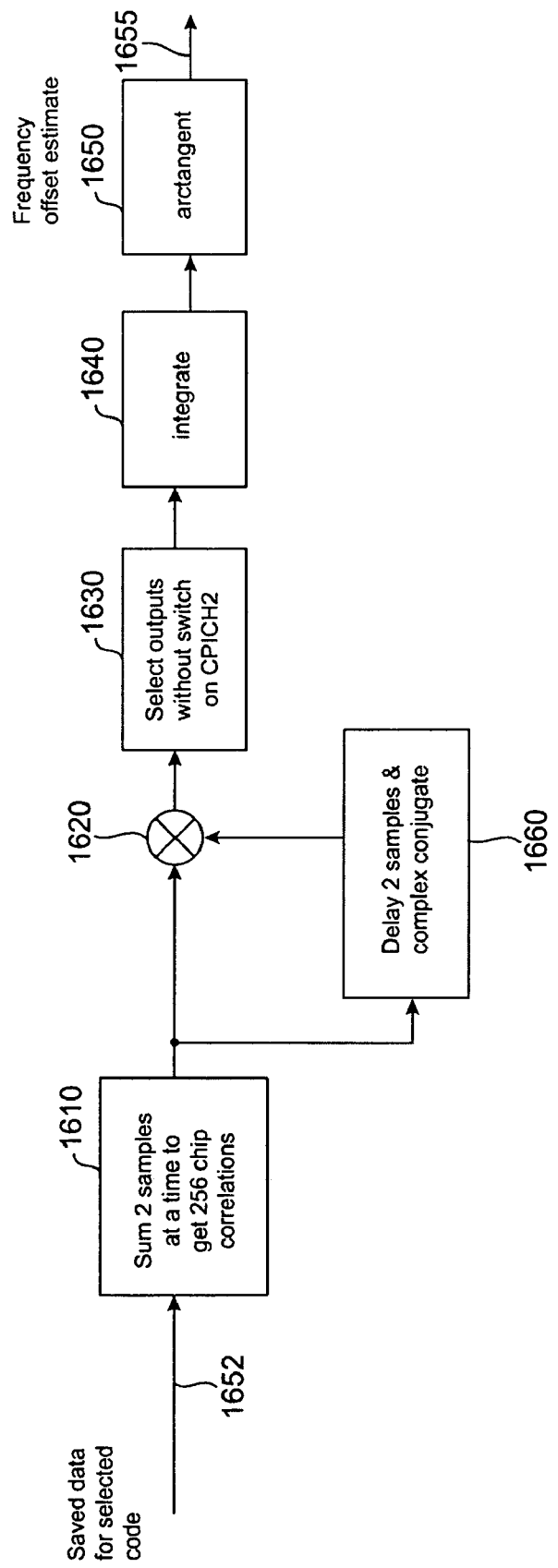
FIG. 16 is a block diagram of a frequency offset estimator that may be used as the frequency offset estimator in FIG. 15.

A coarse adjusted signal from the coarse frequency correction circuit is received on line 1410 and provided to despreader multiplier 1515. Scrambling code generator 1520 provides the code identified by the Phase III code acquisition circuit 340, such as was shown in FIG. 5 and FIG. 12. Despreader multiplier 1515 multiplies the received signal 1510 with the scrambling code provided by scrambling code generator 1520. Integrator 1525 accumulates the values output by despreader multiplier 1515 for 128 chips, resulting in a series of despread symbols or samples. These despread symbols are provided to frequency offset estimator 1540. One embodiment of the frequency offset estimator is shown in FIG. 16. Alternately, it may be the same as or similar to the circuits shown in FIG. 7 and FIG. 13. The output of the frequency offset estimator 1540 is multiplied with the coarse adjusted signal on line 1510 to further reduce its phase error.

FIG. 16 is a block diagram of a frequency offset estimator that may be used as the frequency offset estimator of FIG. 15 or similar circuits in other embodiments of the present invention. Included are a summing circuit 1610, complex conjugate multiplier 1620, selection circuit 1630, integrator 1640, arctangent circuit 1615, and delay and complex conjugate circuit 1660. This circuit generates a fine frequency offset estimate on line 1655 that may be used by date despreader circuit 370 or other receiver circuits. Data saved from the Phase III acquisition is further processed following a first or coarse frequency offset correction. Then, adjacent 128-chip correlations are combined to produce 256-chip correlations, thus providing coherent gain and suppressing the CCPCH over the entire time slot. The differential phase is taken between the resulting 256-chip correlations, though only every other differential phase result is used in the final calculations, since the transmit diversity, that is the use of two antennas 120 by base station 110, introduces a phase discontinuity on CPICH2 when switching from an "A" to an "−A" symbol and vice versa.

Specifically, the datastream provided after a first coarse frequency offset correction, for example the signal at 1252 in FIG. 12, is provided on line 1652. Every two symbols or 128 chip correlations are summed to provided 256 chip correlations by summer 1610. These 256 chip symbols are delayed by one 256 chip symbol period, which is equal to two 128 chip sample periods, by delay and complex conjugate circuit 1660. The complex conjugate of the delayed signal is multiplied with the original signal and provided to selector circuit 1630. Selector 1630 removes every other product, that is those where the terms of the products have different polarities of CPICH2 1150. The remaining products are integrated by integrator 1640. The arctangent of this sum is taken and provided as a fine frequency offset correction on line 1655.

FIG. 17 illustrates the method of obtaining a fine frequency offset estimation used by the circuit of FIG. 16, or other circuits consistent with embodiments of the present invention. Included are 10 symbol periods 1710 corresponding to the symbols in one time slot of frame 1140. Again, the CCPCH signal 1720 is not transmitted during the first symbol period. During subsequent 256 chip periods, CCPCH 1720 consists of a Walsh coded signal of 128 ones followed by 128 negative ones. Accordingly, when two consecutive 128 chip correlations are summed, the contribution of CCPCH 1720 is self-canceling.

The CPICH2 signal 1730 is a coded all ones signal that is multiplied by one or negative one for each symbol has indicated. These 256 chip correlations provided by summer 1610 are labeled as $S_0$ through $S_9$. The delayed complex conjugate of these symbols 1750 and the products 1760 generated by complex multiplier 1620 also listed. As can be seen, the products associated with symbol one, $S_1$ times $S_0$(conjugate) 1785, is made up of the product of the 256 chip correlations from symbols zero and one. But CPICH2 1730 has opposite polarities for these symbols. Accordingly, this term is dropped by select circuit 1630 and not integrated by integrator 1640. Thus, it does not appear as one of the integrated terms 1770. Conversely, the products associated with symbol 2, $S_2$ times $S_1$(conjugate) 1790, is made up of the product of the 256 chip correlations from symbols one and two. CPICH2 1730 has the same polarity during the these symbol periods. Accordingly, this product 1790 is integrated by integrator 1640, and appears as one of the integrated terms 1770. The arctangent of the integrated sum is an angle that is approximately twice the residual frequency error remaining from the first coarse offset correction.

Figure 18:
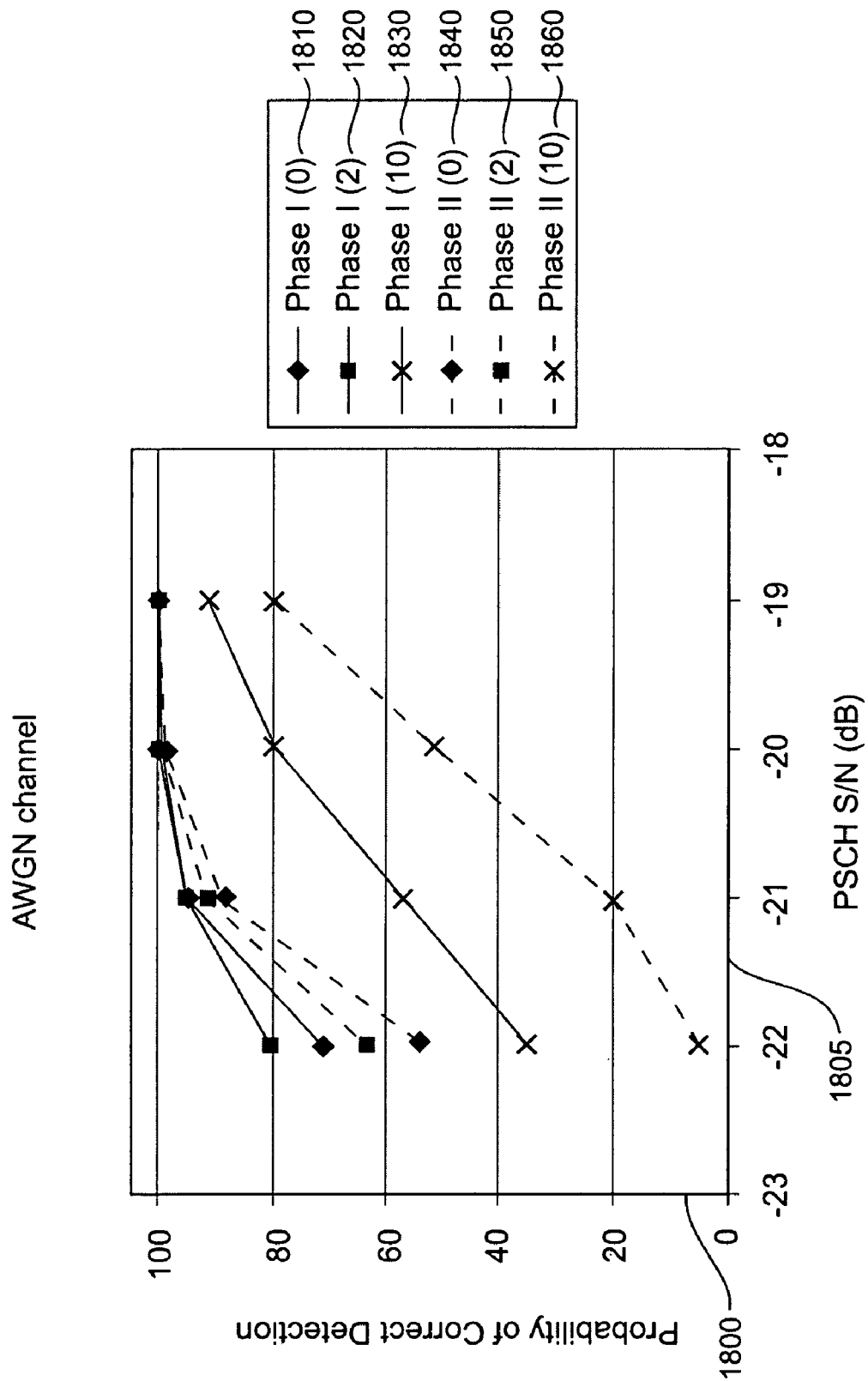
FIG. 18 shows simulation results for Phase I and Phase II acquisition by circuits used in receivers incorporating embodiments of the present invention.

FIG. 18 shows simulation results for Phase I and Phase II acquisition by circuits used in receivers incorporating embodiments of the present invention. The probability of correct detection of time slot boundaries after Phase I, and frame boundaries and code group after Phase II is plotted along Y-axis 1800 as a function of the received signal's signal to noise ratio 1805. The simulations were done assuming an AWGN channel, that is a channel where white Gaussian noise is added to the signal.

Probabilities of correct detection are shown as a function of frequency offset. Specifically, curve 1810 is the probability of correct detection of slot boundaries where there is no frequency offset, for 1820 there is a 2 kHz offset, and for 1830 there is a 10 kHz offset. Similarly, curve 1830 is the probability of correct detection of frame boundaries and code group where there is no frequency offset, for 1850 there is a 2 kHz offset, and for 1860 there is a 10 kHz offset. As can be seen, at −19 dB and a 10 kHz frequency offset, there is an 80 percent chance of correct detection of the frame boundaries and code group after Phase II acquisition.

Figure 19:
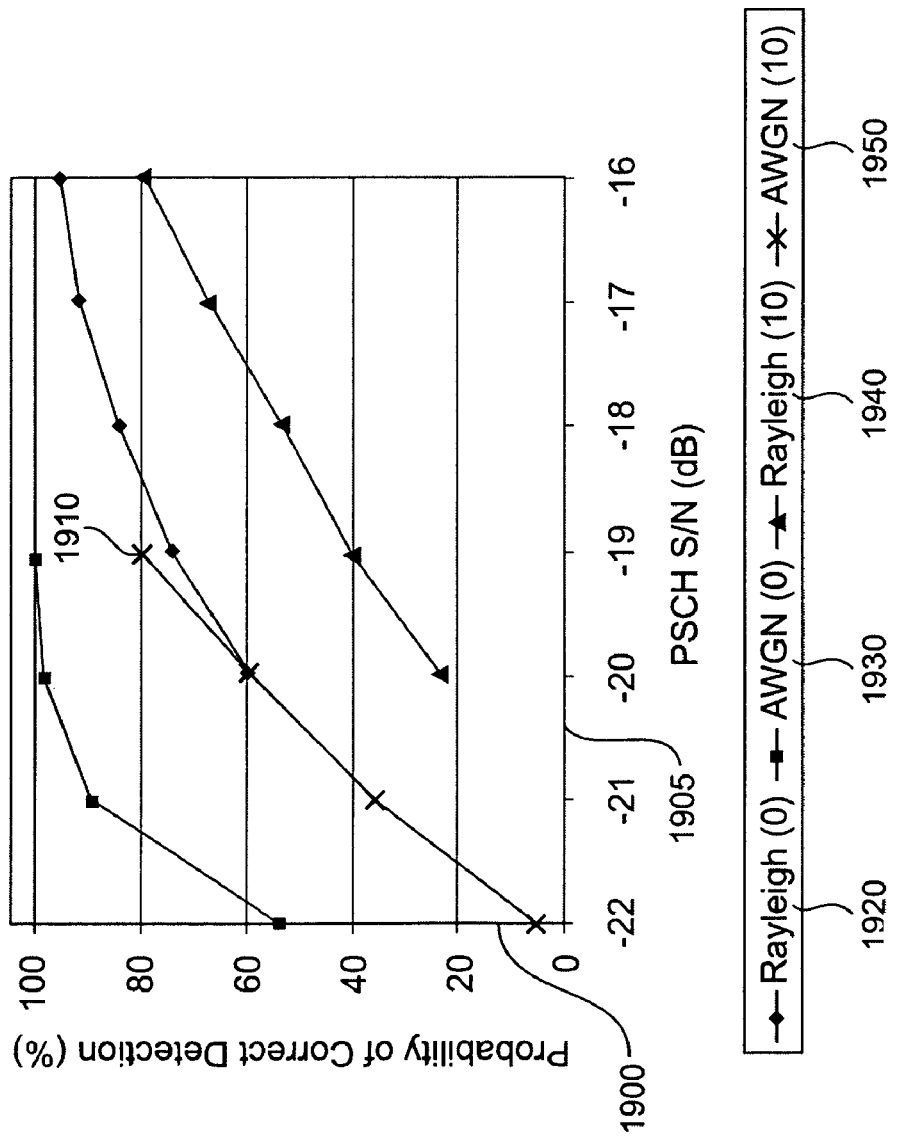
FIG. 19 shows simulation results through Phase III acquisition and Phase IV verification by circuits used in receivers incorporating embodiments of the present invention.

FIG. 19 shows simulation results through Phase III acquisition and verification by circuits used in receivers incorporating embodiments of the present invention. The probability of correct detection and verification of the code after Phase IV is plotted along Y-axis 1900 as a function of the received signal's signal to noise ratio 1905. The simulations were done assuming either an AWGN or Rayleigh channel.

Probabilities of correct detection are shown as a function of frequency offset. Specifically, curve 1920 is the probability of correct detection where there is no frequency offset and curve 1940 is the probability of correct detection where there is a 10 kHz offset. For both these curves, the channel is a Rayleigh. Similarly, curve 1930 is the probability of correct detection where there is no frequency offset, and curve 1950 is the probability of correct detection where there is a 10 kHz offset. For these curves, the channel is an AWGN.

As can be seen at point 1910, at an input level of −19 dB and a 10 kHz frequency offset for an AWGN channel, there is an 80 percent chance of correct detection after Phase IV verification. Accordingly, the Phase III acquisition and verification circuits of the present invention do not limit performance of the receiver. That is, if there is sufficient signal for the Phase I and Phase II circuits to acquire the boundary and code group information, the Phase III acquisition and Phase IV verification circuits can determine and verify the code used by base station 110. Also, the Phase III acquisition and Phase IV verification circuits are not interfering with the performance of the Phase I and Phase II acquisition circuits.

Thus, embodiments of the present invention provide simple and robust techniques for combining frequency offset correction circuits with multiple stages of coherent combining for Phase III scrambling code acquisition and Phase IV verification of WCDMA signals. These circuits are in parallel with and do not interfere with the Phase I and II acquisition circuits.

Throughout, reference has been given to particular implementations for WCDMA wireless transmission. Specific examples, such as symbols having 256 chips and correlations performed over 128 chips were given. Again, these examples are not intended to limit the claims or the possible embodiments of the present invention. For example, symbols of other lengths may be used, and correlations may be done over a different number of chips.

The foregoing description of specific embodiments of the invention has been presented for the purposes of illustration and description. It is not intended to be exhaustive or to limit the invention to the precise form described, and many modifications and variations are possible in light of the teaching above. The various circuit and block diagrams shown may be implemented in hardware, firmware, software, or any combination thereof. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method for processing a wireless signal, comprising:
   a) determining a plurality of time-slot boundaries for a current portion of the wireless signal using a primary synchronizing signal within the wireless signal; and
   b) determining a plurality of frame boundaries and a code group associated with the current portion and used by a base station for transmitting the wireless signal, using a secondary synchronizing signal within the wireless signal;
   c) determining a first code used by the base station associated with a previous portion of the wireless signal, using a common pilot channel signal within the wireless signal; and
   d) verifying whether the first code is the code used by the base station, wherein a) and b) are performed serially, wherein c) and d) are performed serially, and wherein a) and b) are performed concurrently with respect to c) and d).

2. The method of claim 1, comprising:
   after verifying that the first code is the code used by the base station,
   providing the first code to a data despreader.

3. The method of claim 1, wherein a common pilot channel signal is used to determine the first code by:
   receiving the common pilot channel signal;
   providing the first code;
   despreading the common pilot channel signal with the first code to generate a first plurality of symbols;
   using the first plurality of symbols to generate a first frequency offset estimation; and
   using the first frequency offset estimation to generate a second plurality of symbols.

4. The method of claim 3, wherein each symbol in the first plurality of symbols is a first symbol in a time slot.

5. The method of claim 3, wherein the first code is verified to be the code used by the base station by:
   receiving the common pilot channel signal;
   providing the first code;
   despreading the common pilot channel signal with the first code to generate a third plurality of symbols;
   using the third plurality of symbols to generate a second frequency offset estimation; and
   using the second frequency offset estimation to generate a fourth plurality of symbols.

6. The method of claim 5, wherein the first frequency offset estimation is generated by:
  delaying the first plurality of symbols to generate a third plurality of symbols;
  multiplying each of the symbols in the first series of symbols with a complex conjugate of a corresponding symbol in the third plurality of symbols to generate a first series of products;
  integrating the first series of products to generate a first value; and
  generating the arctangent of the first value.

7. A method for determining a scrambling code used by a base station, comprising:
  receiving a signal from the base station;
  determining a code group used by the base station;
  generating a plurality of codes in the code group;
  despreading a plurality of chips of the received signal with each of the plurality of codes in the code group to generate a first plurality of series of symbols;
  generating a plurality of frequency offset estimation signals, one for each of series of symbols in the first plurality of series of symbols;
  multiplying each series of symbols in the first plurality of series of symbols with a frequency offset estimation signal from the plurality of frequency offset estimation signals to generate a second plurality of series of symbols;
  coherently integrating each of the series of symbols in the second plurality of series of symbols to generate a plurality of integrated values; and
  determining the largest integrated value.

8. The method of claim 7, comprising using the largest integrated value to determine a first code.

9. The method of claim 8, comprising verifying that the first code is the code used by the base station.

10. The method of claim 9, comprising:
  verifying that the first code is the code used by the base station by:
  providing the first code;
  despreading the signal from the base station using the first code to generate a first series of symbols;
  generating a frequency offset estimation signal with the first series of symbols;
  using the frequency offset estimation signal to generate a second series of symbols from the first series of symbols; and
  demodulating the second series of symbols to generate a series of demodulated symbols.

11. The method of claim 10, comprising counting the demodulated symbols within the series.

12. A method for processing a wireless signal, comprising:
  receiving the wireless signal from a base station;
  determining a code group used by the base station;
  determining a code within the code group used by the base station;
  verifying the code used by the base station by:
    providing the code used by the base station;
    despreading a plurality of symbols of the received wireless signal with the code used by the base station to generate a first series of symbols; and
    using the first series of symbols to generate a first frequency offset estimation signal;
    using the first frequency offset estimation signal to frequency adjust the received wireless signal from the base station to generate a first frequency adjusted signal;
    using the first frequency adjusted signal to generate a second frequency adjusted signal; and
    despreading the second frequency adjusted signal with the code used by the base station.

13. The method of claim 12, wherein the first frequency offset estimation signal is generated by:
  delaying the first series of symbols by one symbol period to generate a delayed series of symbols;
  multiplying the each of the symbols in the first series of symbols with a complex conjugate of a corresponding symbol in the delayed series of samples to generate a first series of products;
  integrating the first series of products to generate a first value; and
  generating the arctangent of the first value.

14. The method of claim 12, wherein there is a first number of symbol periods in a time slot, and in the time slot, a second number of symbols in the first series of symbols is used to generate the first frequency offset estimation signal.

15. The method of claim 12, wherein the second frequency adjusted signal is generated by:
  receiving the first frequency adjusted signal;
  despreading the first frequency adjusted signal using the code used by the base station to generate a second series of symbols;
  using the second series of symbols to generate a second frequency offset estimation; and
  using the second frequency offset estimation to frequency adjust the first frequency adjusted signal.

16. An integrated circuit, comprising:
  a first frequency correction circuit configured to adjust the frequency of an input signal using a frequency offset estimation symbol selected from a plurality of frequency offset estimation symbols;
  a second frequency correction circuit configured to adjust the frequency of the first frequency corrected input signal to generate a second frequency corrected input signal;
  a code generator configured to generate a first code associated with the input signal prior to said frequency correction by said first frequency correction circuit and said second frequency correction circuit; and
  a first despreader configured to despread said second frequency corrected input signal using the first code.

17. The integrated circuit of claim 16, wherein the first and second frequency correction circuits comprise:
  a delay and complex conjugate circuit coupled to an input;
  a multiplier coupled to the delay and complex conjugate circuit;
  an integrator coupled to the multiplier; and
  an arctangent circuit coupled to the integrator.

18. The integrated circuit of claim 17, wherein the first frequency correction circuit further comprises:
  a select circuit coupled between the multiplier and the integrator, wherein the select circuit selects a first output from the multiplier corresponding to a start of a time slot.

19. The integrated circuit of claim 17, wherein the second frequency correction circuit further comprises:
  a select circuit coupled between the multiplier and the integrator, wherein the select circuit selects alternating outputs from the multiplier.

20. An integrated circuit, comprising:
  a first circuit configured to receive a primary synchronizing signal within a current portion of a received wireless signal and to determine a plurality of time-slot boundaries for the received wireless signal;

a second circuit configured to receive a secondary synchronizing signal within the current portion of the received wireless signal and to determine a plurality of frame boundaries and a code group for the received wireless signal;

a third circuit configured to receive a common pilot channel signal within a previous portion of the received wireless signal and to determine a first code used by a base station to transmit the received wireless signal; and a fourth circuit configured to verify that the common pilot channel signal within the previous portion of the received wireless signal is encoded using the first code, wherein the determining by the first circuit is performed in series with the determining by the second circuit, wherein the determining by the third circuit is performed in series with the determining by the fourth circuit, and wherein the determining by the first circuit and the second circuit is performed concurrently with respect to the determining by the third circuit and the determining by the fourth circuit.

21. The integrated circuit of claim 20, wherein the fourth circuit is further configured to provide the first code to a fifth circuit after verifying that the first code is the code used by the base station.

22. The integrated circuit of claim 20, wherein the third circuit comprises:
   a code generator configured to generate the first code;
   a despreader configured to despread the common pilot channel signal with the first code to generate a first plurality of symbols; and
   a first frequency correction circuit configured to adjust a first frequency of the first plurality of symbols to generate a second plurality of symbols.

23. The integrated circuit of claim 22, wherein each symbol in the first plurality of symbols is a first symbol in a time slot.

24. The integrated circuit of claim 22, comprising:
   a second frequency correction circuit configured to receive an input signal and generate a frequency adjusted signal, wherein the third circuit despreads the frequency adjusted signal using the first code.

* * * * *

UNITED STATES PATENT AND TRADEMARK OFFICE
CERTIFICATE OF CORRECTION

| | | |
|---|---|---|
| PATENT NO. | : 7,826,493 B2 | Page 1 of 1 |
| APPLICATION NO. | : 10/228165 | |
| DATED | : November 2, 2010 | |
| INVENTOR(S) | : Chang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2491 days.

Signed and Sealed this
Seventh Day of June, 2011

David J. Kappos
*Director of the United States Patent and Trademark Office*